US009813375B2

(12) United States Patent
Tanaka et al.

(10) Patent No.: US 9,813,375 B2
(45) Date of Patent: Nov. 7, 2017

(54) RELAY APPARATUS, RELAY SYSTEM, AND RELAY METHOD

(71) Applicant: FUJITSU LIMITED, Kawasaki-shi, Kanagawa (JP)

(72) Inventors: Daichi Tanaka, Sinagawa (JP); Tomoyuki Sone, Yokohama (JP); Chiaki Endo, Numazu (JP); Yasunori Terasaki, Kawasaki (JP); Toshiyuki Okamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 14/852,168

(22) Filed: Sep. 11, 2015

(65) Prior Publication Data

US 2016/0119281 A1 Apr. 28, 2016

(30) Foreign Application Priority Data

Oct. 23, 2014 (JP) .................................. 2014-216007

(51) Int. Cl.
*H04L 12/28* (2006.01)
*H04L 29/12* (2006.01)
(Continued)

(52) U.S. Cl.
CPC ...... *H04L 61/2517* (2013.01); *H04L 12/2854* (2013.01); *H04L 47/825* (2013.01);
(Continued)

(58) Field of Classification Search
CPC ............. H04L 61/2517; H04L 63/0272; H04L 12/2854; H04L 61/6077; H04L 47/825;
(Continued)

(56) References Cited

U.S. PATENT DOCUMENTS 6,965,599 B1 * 11/2005 Sakurai ............. H04L 29/12009
370/392
2005/0111455 A1 5/2005 Nozue et al.
(Continued)

FOREIGN PATENT DOCUMENTS

JP 11-355302 12/1999
JP 2005-151509 6/2005
(Continued)

OTHER PUBLICATIONS

Extended European Search Report dated Mar. 18, 2016 for corresponding European Patent Application No. 15185430.4, 8 pages.
(Continued)

*Primary Examiner* — Robert Wilson
(74) *Attorney, Agent, or Firm* — Fujitsu Patent Center

(57) ABSTRACT

Upon receipt of a packet addressed to a virtual IP address assigned to each first device from a second device outside a base network, a processor identifies a base relay apparatus that accommodates the first device, to which the virtual IP address is assigned, on the basis of the virtual address and a protocol type of the received packet, and also identifies a reception port number of the identified base relay apparatus, which corresponds to a combination of the virtual IP address and the protocol type of the received packet, from among reception port numbers each assigned to a combination of the first device accommodated to identify a transfer destination, and a protocol type. Then, the processor relays the received packet to the identified reception port number of the identified base relay apparatus.

11 Claims, 21 Drawing Sheets

(51) Int. Cl.
*H04L 12/911* (2013.01)
*H04W 4/00* (2009.01)
*H04W 88/16* (2009.01)
*H04L 29/06* (2006.01)
*H04L 29/08* (2006.01)

(52) U.S. Cl.
CPC ...... *H04L 61/6077* (2013.01); *H04L 63/0272* (2013.01); *H04W 4/005* (2013.01); *H04W 88/16* (2013.01); *H04L 61/2007* (2013.01); *H04L 61/2038* (2013.01); *H04L 63/029* (2013.01); *H04L 67/12* (2013.01)

(58) Field of Classification Search
CPC ... H04L 63/029; H04L 61/2007; H04L 67/12; H04L 61/2088; H04W 88/16; H04W 4/005

See application file for complete search history.

(56) References Cited

U.S. PATENT DOCUMENTS

| | | |
|---|---|---|
| 2005/0223096 A1 | 10/2005 | Shinkai |
| 2016/0119281 A1* | 4/2016 | Tanaka ............... H04W 4/005 370/392 |

FOREIGN PATENT DOCUMENTS

| | | |
|---|---|---|
| JP | 2006-222586 | 8/2006 |
| WO | 2004/051943 | 6/2004 |
| WO | 2012/135680 A1 | 10/2012 |

OTHER PUBLICATIONS

3GPP Standard; 3GPP TR 23.888, 3rd Generation Partnership Project (3GPP), Mobile Competence Centre, "3rd Generation Partnership Project; Technical Specification Group Services and System Aspects; System improvements for Machine-Type Communications (MTC) (Release11)", vol. SA WG2, No. V11.0.0, Sep. 18, 2012, pp. 1-165.
European Office Action dated May 30, 2017 for corresponding European Patent Application No. 15185430.4, 9 pages.

* cited by examiner

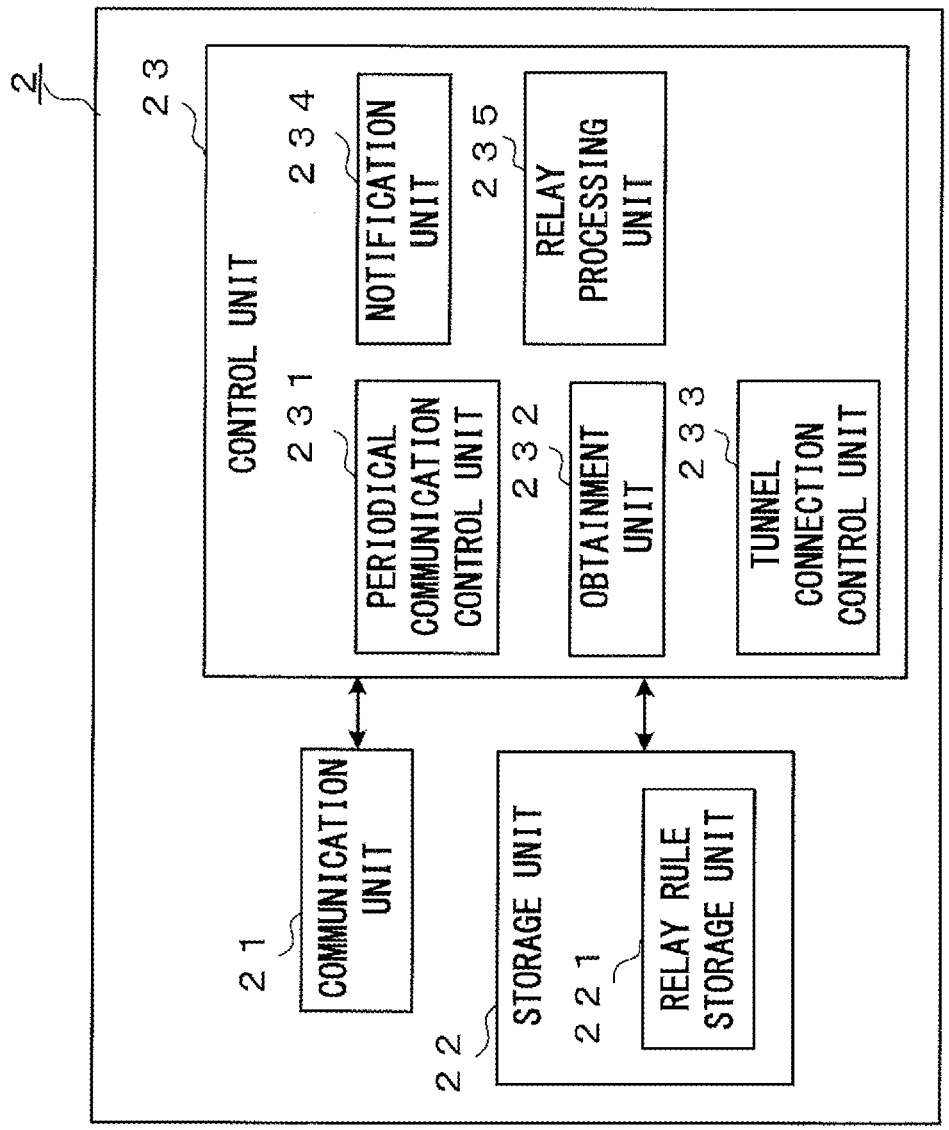
F I G. 3

DOWNSTREAM RELAY RULES

| ACCESS NW TYPE | ACCESS PORT NUMBER | PROTOCOL TYPE | TRANSFER DESTINATION IP ADDRESS | TRANSFER DESTINATION PORT NUMBER |
|---|---|---|---|---|
| WAN | 10001 | TCP | 192.168.1.4 | 80 |
| WAN | 10002 | UDP | 192.168.1.4 | 81 |
| WAN | 10003 | TCP | 192.168.1.5 | 80 |
| ..... | ..... | ..... | ..... | ..... |

F I G. 4

UPSTREAM RELAY RULES

| ACCESS NW TYPE | ACCESS IP ADDRESS | ACCESS PORT NUMBER | PROTOCOL TYPE | TRANSMISSION SOURCE IP ADDRESS | TRANSFER DESTINATION IP ADDRESS | TRANSFER DESTINATION PORT NUMBER |
|---|---|---|---|---|---|---|
| LAN | 192.168.1.2 | 100 | TCP | 192.168.1.4 | 192.168.0.20 | 2001 |
| LAN | 192.168.1.2 | 101 | UDP | 192.168.1.4 | 192.168.0.20 | 2002 |
| LAN | 192.168.1.2 | 100 | TCP | 192.168.1.5 | 192.168.0.20 | 2003 |
| ...... | ...... | ...... | ...... | ...... | ...... | ...... |

FIG. 5

| TRANSMISSION SOURCE ID | TRANSMISSION SOURCE PORT NUMBER | DESTINATION ID | DESTINATION PORT NUMBER | PROTOCOL TYPE |
|---|---|---|---|---|

FIG. 6

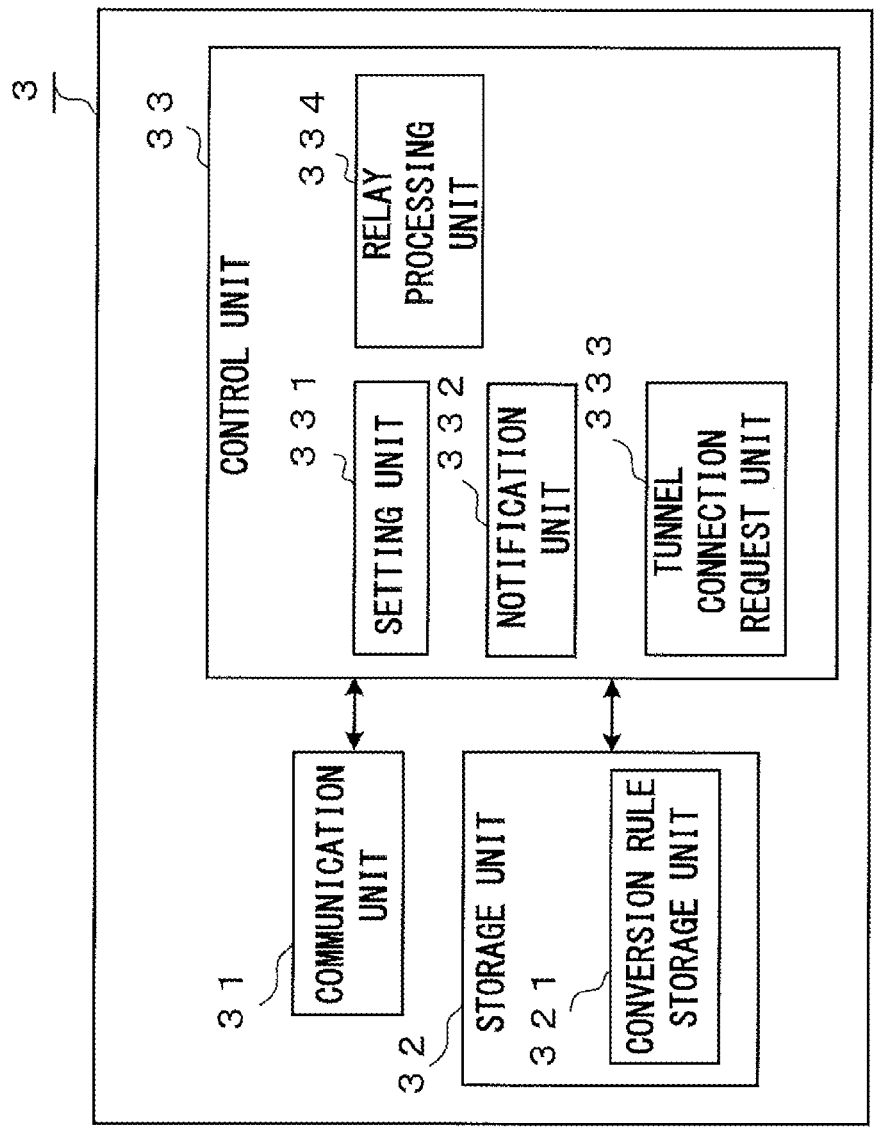
F I G. 7

DOWNSTREAM CONVERSION RULES

| RECEPTION DESTINATION IP ADDRESS | RECEPTION DESTINATION PORT NUMBER | PROTOCOL TYPE | TRANSFER DESTINATION IP ADDRESS | TRANSFER DESTINATION PORT NUMBER |
|---|---|---|---|---|
| 10.10.10.10 | 80 | TCP | 192.168.0.3 | 10001 |
| 10.10.10.10 | 81 | UDP | 192.168.0.3 | 10002 |
| 10.10.10.12 | 80 | TCP | 192.168.0.3 | 10003 |
| ...... | ...... | ...... | ...... | ...... |

FIG. 8

UPSTREAM CONVERSION RULES

| RECEPTION DESTINATION IP ADDRESS | RECEPTION DESTINATION PORT NUMBER | PROTOCOL TYPE | TRANSFER DESTINATION IP ADDRESS | TRANSFER DESTINATION PORT NUMBER | CONVERSION IP ADDRESS |
|---|---|---|---|---|---|
| 192.168.0.20 | 20001 | TCP | 10.10.20.7 | 200 | 10.10.10.10 |
| 192.168.0.20 | 20002 | UDP | 10.10.20.7 | 201 | 10.10.10.10 |
| 192.168.0.20 | 20003 | TCP | 10.10.20.7 | 200 | 10.10.10.12 |
| ...... | ...... | ...... | ...... | ...... | ...... |

FIG. 9

RELAY APPARATUS, RELAY SYSTEM, AND RELAY METHOD

CROSS-REFERENCE TO RELATED APPLICATION

This application is based upon and claims the benefit of priority of the prior Japanese Patent Application No. 2014-216007, filed on Oct. 23, 2014, the entire contents of which are incorporated herein by reference.

FIELD

The embodiments discussed herein are related to a relay apparatus, a relay system, a relay method, and a program.

BACKGROUND

In recent years, techniques related to Machine to Machine (M2M) communication by which a communication is performed between devices having a communication function (herein referred to simply as devices) have been actively developed.

As one example of M2M, for example, a case where a device (such as a personal computer: PC) within a network on a center side communicates with a device within a base network so as to collect information from devices within the base network of an enterprise, or to control the devices is assumed. In such a case, a relay apparatus (hereinafter referred to as an M2M-GW apparatus) that accommodates and manages various types of devices within a base network is installed within the base network.

Communication protocols respectively supported by devices within a base network are diversified, and the devices respectively include an interface (I/F) pursuant or not pursuant to the Internet Protocol (IP). Accordingly, an M2M-GW apparatus has a function of identifying a subordinate device on the basis of a reception port (access port), and of executing processes such as a conversion of various types of protocols, a data analysis, a control and the like.

SUMMARY

A relay apparatus in one embodiment is a relay apparatus communicatively connected, via a network, to each base relay apparatus arranged within a base network that accommodates one or a plurality of first devices having a communication function within the base network. The relay apparatus includes: a communication interface configured to transmit and receive a packet; and a processor configured to relay the received packet in accordance with a specified rule. Upon receipt of a packet addressed to a virtual IP (Internet Protocol) address assigned to each of the first devices from a second device having a communication function outside of the base network, the processor identifies the base relay apparatus that accommodates the first device, to which the virtual IP address is assigned, on the basis of the virtual IP address and a protocol type of the received packet, and also identifies a reception port number of the identified base relay apparatus, which corresponds to a combination of the virtual IP address and the protocol type of the received packet, from among reception port numbers each assigned to a combination of the first device accommodated to identify a transfer destination and a protocol type. Then, the processor relays the received packet to the identified reception port number of the identified base relay apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a functional block diagram illustrating a configuration example of an M2M-GW apparatus in the embodiment;

FIG. 4 illustrates a configuration example of downstream relay rules in the embodiment;

FIG. 5 illustrates a configuration example of upstream relay rules in the embodiment;

FIG. 6 illustrates an example of a format of a packet header in the embodiment;

FIG. 7 is a functional block diagram illustrating a configuration example of an access GW apparatus in the embodiment;

FIG. 8 illustrates a configuration example of downstream conversion rules in the embodiment;

FIG. 9 illustrates a configuration example of upstream conversion rules in the embodiment;

DESCRIPTION OF EMBODIMENTS

When a device on a center side transmits a packet to a device within a base network, the device on the center side accesses the device within the base network via an M2M-GW apparatus that accommodates the device of an access destination. Accordingly, the M2M-GW apparatus changes a reception port (access port) for each device of an access destination so as to identify the device of the access destination on the basis of the reception port (access port).

In this case, the device on the center side preferably changes a transmission port number of the M2M-GW apparatus that relays a packet, in accordance with a device of an access destination. However, there may be cases where a transmission port number cannot be changed in accordance with a device of an access destination, such as a device having a hard-coded transmission port number on the center side, a device having a transmission port number that is not changeable in operation, or the like. In such a case, the same port of the M2M-GW apparatus cannot be accessed at the same time. Therefore, a plurality of devices accommodated by the same M2M-GW apparatus cannot be accessed simultaneously. This leads to a problem such that an N-to-N communication cannot be performed between the device on the center side and that within a base network.

An embodiment according to the present invention is described in detail below with reference to the drawings.

Figure 1:
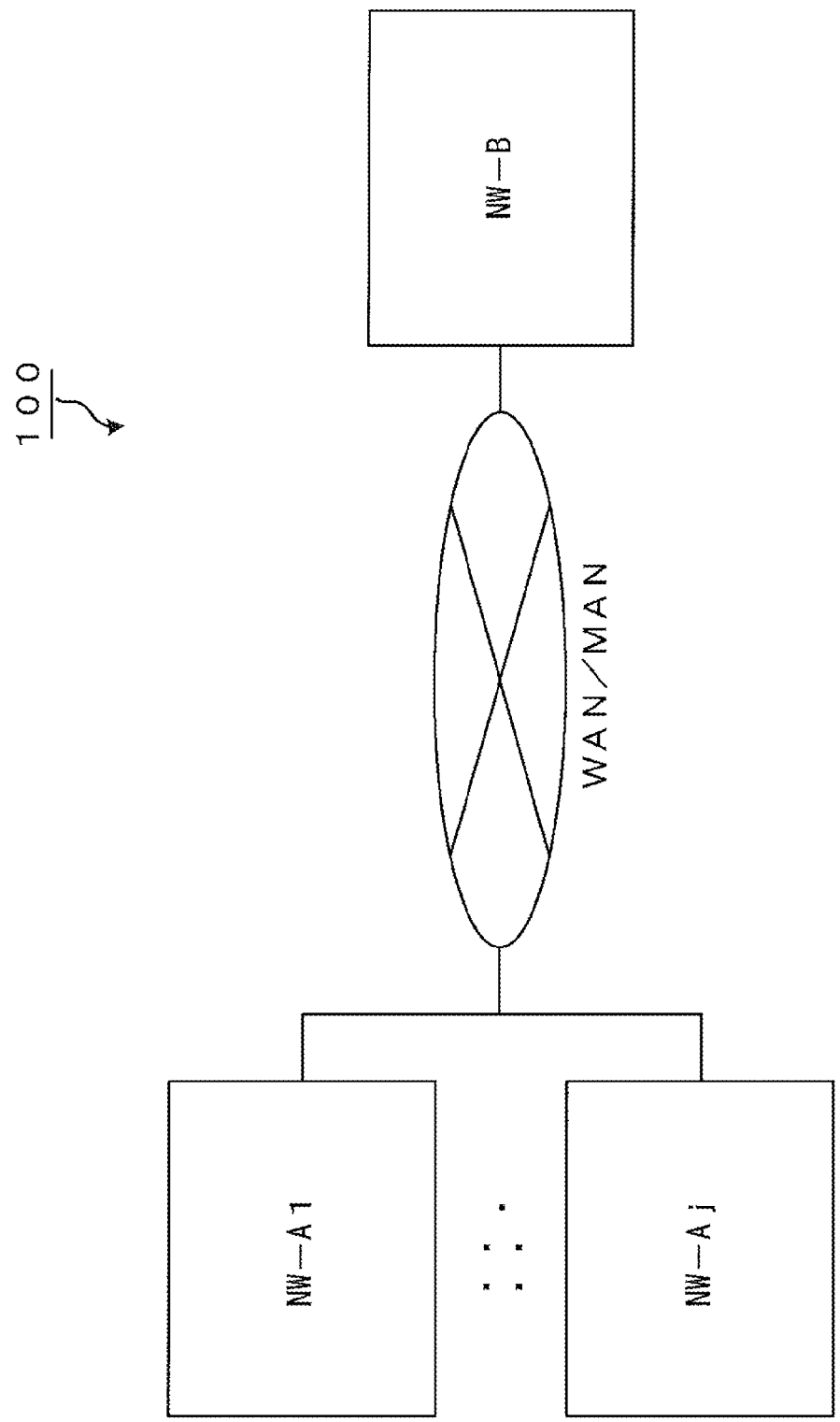
FIG. 1 illustrates a configuration example of a network in an embodiment.

FIG. 1 illustrates a configuration example of a network 100 in an embodiment. The network 100 is merely one example, and includes a plurality of types of networks. The network 100 illustrated in FIG. 1 is, for example, an enterprise network. In the example of the network 100 illustrated in FIG. 1, a plurality of local area networks (LANs) such as networks NW-A1 to Aj (j is an integer equal to or larger than 1), a network NW-B, and the like are connected by a wide area network (WAN) such as the Internet or the like.

In this embodiment, each of the networks NW-A1 to Aj is a so-called base LAN (a base Network), and the network NW-B is a LAN on a center side. When there is no need to particularly make a distinction among the networks NW-A1 to Aj, they are generically referred to as a network NW-A hereinafter.

Figure 2:
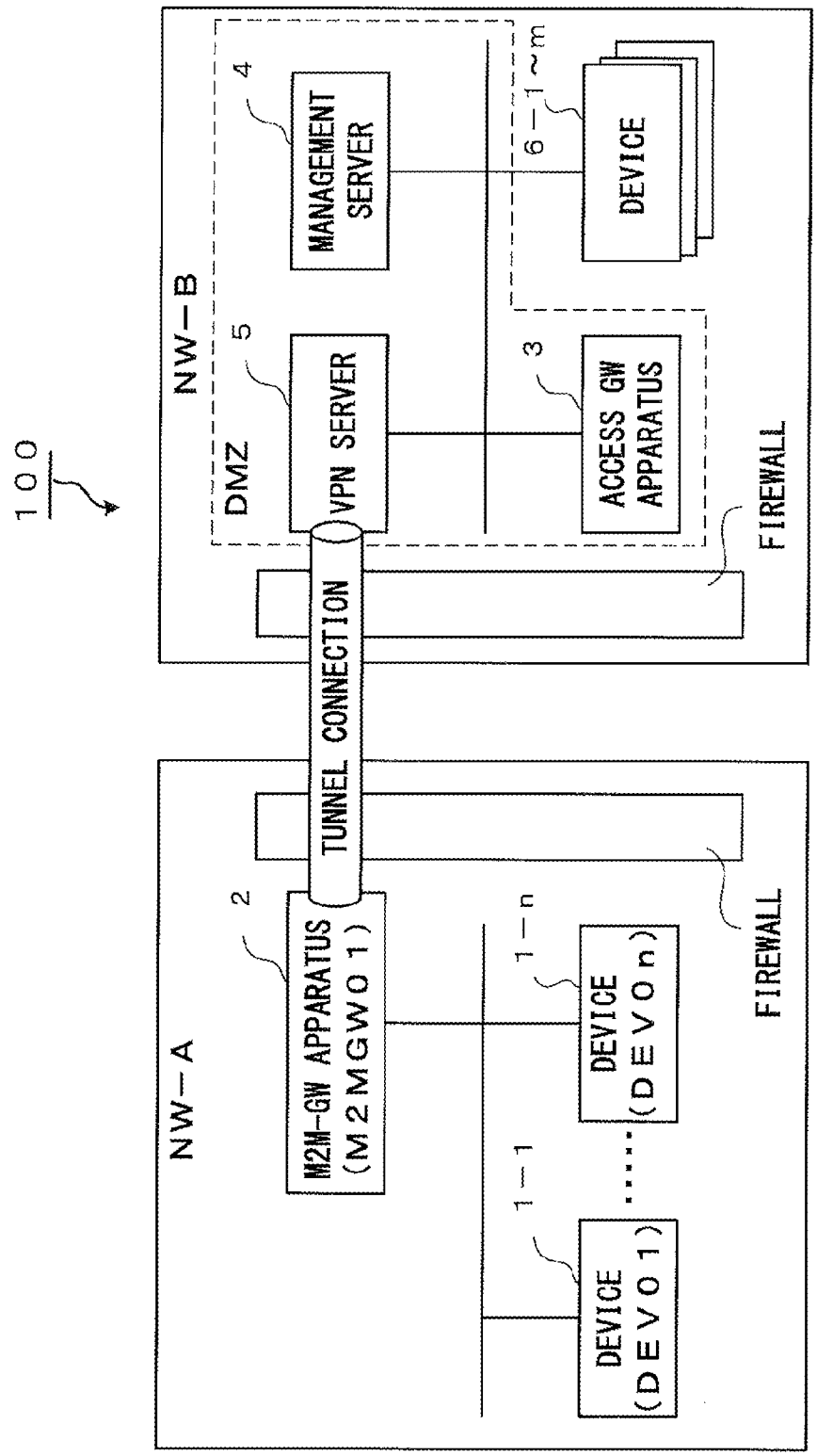
FIG. 2 illustrates a configuration example of two networks that configure the network in the embodiment.

FIG. 2 illustrates a configuration example of two networks (the network NW-A and the network NW-B) that configure the network 100 in this embodiment. In the network NW-A and the network NW-B, security such as a firewall or the like for preventing an illegal access is set as illustrated in FIG. 2. When a communication is performed between LANs in a case where they are connected not via a dedicated line but via a WAN as illustrated in FIG. 1, the communication is normally performed after a tunnel connection has been established between the LANs so as to ensure security.

A tunnel is a closed virtual dedicated line that links two points. As a tunnel connection, for example, a Virtual Private Network (VPN) connection, a Point-to-Point Protocol (PPP) connection, or the like is known. FIG. 2 illustrates an example of a case where the tunnel connection is a VPN connection.

As illustrated in FIG. 2, the network NW-A includes one or a plurality of devices 1-1 to 1-n (n is an integer equal to or larger than 1), and an M2M-GW apparatus 2 (to be described in detail later), which is a relay apparatus that accommodates the devices 1-1 to 1-n. When there is no need to make a distinction among the devices 1-1 to 1-n, they are generically referred to as a device 1 hereinafter. Moreover, characters within parentheses in FIG. 2 represent a device ID (IDentification) of a device 1 or the M2M-GW apparatus 2. The device ID is an identifier with which the device 1, the M2M-GW apparatus 2 or the like is uniquely identifiable.

As illustrated in FIG. 2, the network NW-B includes an access GW apparatus 3 (to be described in detail later), a management server 4, a VPN server 5, and one or a plurality of devices 6-1 to 6-m (m is an integer equal to or larger than 1). The access GW apparatus 3, the management server 4 and the VPN server 5 are installed in a DeMilitarized (DMZ) zone as illustrated in FIG. 2.

The management server 4 is a device that manages the M2M-GW apparatus 2, the access GW apparatus 3 and the like, and performs a periodical communication with each M2M-GW apparatus 2 in order to transmit, to the M2M-GW apparatus 2, various types of control signals such as a relay rule obtainment instruction and the like. The periodical communication is that using a protocol such as HyperText Transfer Protocol (HTTP), HyperText Transfer Protocol Secure (HTTPS), or the like. The M2M-GW apparatus 2 periodically performs, for example, an HTTP polling for the management server 4. When the management server 4 makes a reply, it returns a control signal such as a relay rule obtainment instruction, a connection instruction, or the like. Upon receipt of a relay rule obtainment request (to be described in detail later) transmitted from the M2M-GW apparatus 2 in reply to the relay rule obtainment instruction, the management server 4 returns a corresponding relay rule (including a process type). The relay rule obtainment instruction is a control signal intended to issue an instruction for obtaining a relay rule. The connection instruction is a control signal intended to issue, to the M2M-GW apparatus 2, an instruction for establishing a tunnel connection.

Additionally, the management server 4 transmits, to the access GW apparatus 3, a conversion rule (including a process type) so as to cause the access GW apparatus 3 to set the conversion rule (to be described in detail later). The management server 4 generates a relay rule and a conversion rule on the basis of contents of settings of the relay rule and the conversion rule that are input, for example, in accordance with each setting screen displayed on a screen of a browser. Then, the management server 4 registers the generated relay rule and conversion rule to a database (DB) server (not illustrated). Alternatively, the management server 4 registers the contents of settings of the relay rule and the conversion rule to the DB server.

The VPN server 5 is a device for establishing a VNP connection with each base LAN (network NW-A).

FIG. 3 is a functional block diagram illustrating a configuration example of the M2M-GW apparatus 2 in this embodiment. The M2M-GW apparatus 2 in this embodiment is a base relay apparatus that relays a packet from a subordinate device 1, or a packet addressed to a subordinate device 1. As illustrated in FIG. 3, the M2M-GW apparatus 2 includes a communication unit 21, a storage unit 22 and a control unit 23.

The communication unit 21 includes, for example, a communication module or a communication interface and the like, and communicates with another device. The communication unit 21 receives, for example, a packet transmitted from a subordinate device 1. Moreover, the communication unit 21 performs a periodical communication with the management server 4, for example, under the control of a periodical communication control unit 231 (to be described in detail later).

The storage unit 22 includes, for example, a Random Access Memory (RAM), a Read Only Memory (ROM), a flash memory and the like. The storage unit 22 functions, for example, as a working area of a Micro-Processing Unit (MPU) included in the control unit 23, a program area for storing various types of programs such as an operation program for controlling the entire M2M-GW apparatus 2, and a data area for storing various types of data.

The storage unit 22 functions also as a relay rule storage unit 221 as illustrated in FIG. 3. The relay rule storage unit 221 stores downstream relay rules used to relay a packet transmitted from a device 6 on the center side to a subordinate device 1, and upstream relay rules used to relay a packet transmitted from a subordinate device 1 to a device 6 on the center side. FIG. 4 illustrates a configuration example of the downstream relay rules in this embodiment. FIG. 5 illustrates a configuration example of the upstream relay rules in this embodiment.

The relay rule storage unit 221 stores the downstream relay rules and the upstream relay rules, for example, by respectively putting them into tables as illustrated in FIGS. 4 and 5. The downstream relay rules in this embodiment are relay rules that a relay processing unit 235 (to be described in detail later) references when it relays the packet transmitted from the device 6 on the center side to the subordinate device 1 as describe above. The downstream relay rules in this embodiment are rules that make an association among an "access NW type", an "access port number", a "protocol type", a "transfer destination IP address", and a "transfer destination port number". The downstream relay rules may further include a "transfer destination device ID", a "transfer destination device type", and the like.

The "access NW type" is a type of a side of a network from which the M2M-GW apparatus 2 has received a packet. When the M2M-GW apparatus 2 has received a packet, for example, from the WAN side, the "access NW type" is WAN.

The "access port number" is a port number of a reception port with which the M2M-GW apparatus 2 has received a packet. The "protocol type" is a type of a protocol to be relayed (Transmission Control Protocol (TCP) or User Datagram Protocol (UDP)).

The "transfer destination IP address" is an IP address of a transfer destination (any of the subordinate devices 1) of the received packet. The "transfer destination port number" is a reception port number of a transfer destination when the received packet is transmitted to the transfer destination. The "transfer destination device ID" is a device ID of the device 1 of the transfer destination of the received packet. The "transfer destination device type" is a device type of the transfer destination, such as a device, a server or the like.

As described above, the upstream relay rules in this embodiment are relay rules that the relay processing unit 235 references when it relays a packet transmitted from the subordinate device 1 to the device 6 on the center side. The upstream relay rules in this embodiment are rules that make an association among an "access NW type", an "access IP address", an "access port number", a "protocol type", a "transmission source IP address", a "transfer destination IP address" and a "transfer destination port number". The upstream relay rules may further include a "transfer destination device type" and the like.

The "access IP address" is an IP address on a side from which the M2M-GW apparatus 2 has received a packet. When the M2M-GW apparatus 2 has received a packet, for example, from the LAN side, the "access IP address" is a LAN side IP address. The "transfer destination IP address" is an IP address of a transfer destination (the access GW apparatus 3 in this embodiment) of the received packet. The "transfer destination port number" is a reception port number of the transfer destination when the received packet is transmitted to the transfer destination.

Returning to FIG. 3. The control unit 23 includes, for example, an MPU, and implements functions as a periodical communication control unit 231, an obtainment unit 232, a tunnel connection control unit 233, a notification unit 234 and the relay processing unit 235 as illustrated in FIG. 3 by executing an operation program stored in the program area of the storage unit 22. The MPU may be a CPU. Moreover, the control unit 23 executes processes such as a control process for controlling the entire M2M-GW apparatus 2, a periodical communication process to be described in detail later, and other processes by executing an operation program.

The periodical communication control unit 231 performs a periodical communication with the management server 4 when a specified timing is reached, and enters a state where control signals such as a relay rule obtainment instruction, a connection instruction and the like are receivable from the management server 4.

Upon receipt of the relay rule obtainment instruction from the management server 4 as a reply to the periodical communication, the obtainment unit 232 obtains a relay rule by transmitting, to the management server 4, a request to obtain the relay rule. Then, the obtainment unit 232 processes the obtained relay rule in accordance with a process type (such as a registration, an update, or a deletion) of the obtained relay rule. The obtainment request is transmitted, for example, by issuing a get command of File Transfer Protocol (FTP).

For example, in a case where the process type is, for example, a registration, the obtainment unit 232 additionally registers the obtained relay rule to the relay rule storage unit 221. Alternatively, in a case where the process type is, for example, an update, the obtainment unit 232 identifies an update target on the basis of the obtained relay rule, and rewrites the relay rule as the update target that is identified and registered in the relay rule storage unit 221 to the obtained relay rule. Further alternatively, in a case where the process type is, for example, a deletion, the obtainment unit 232 identifies a deletion target on the basis of the obtained relay rule, and deletes the identified relay rule as the deletion target from the relay rule storage unit 221.

The tunnel connection control unit 233 establishes a tunnel connection by issuing a tunnel connection request. In a case where the tunnel connection is, for example, a VPN connection, the tunnel connection control unit 233 establishes the VPN connection by issuing a connection request to the VPN server 5 when a connection instruction has been received from the management server 4, or when the VPN connection is not established upon receipt of a packet from a subordinate device 1. Further alternatively, in a case where the tunnel connection is, for example, a PPP connection, the tunnel connection control unit 233 establishes the PPP connection by issuing a connection request to a carrier server (not illustrated) when the connection request instruction has been received from the carrier server, or when the PPP connection is not established upon receipt of a packet from a subordinate device 1.

The notification unit 234 generates various types of notifications, and transmits a generated notification to the management server 4 via the communication unit 21.

For example, when obtainment unit 232 processes a relay rule in accordance with a process type, the notification unit 235 generates a process completion notification reporting that the process of the relay rule has been completed. Upon receipt of the process completion notification, the management server 4 makes, to a DB server, a registration such that the process of the corresponding relay rule has been completed. This can prevent a relay rule obtainment instruction from being redundantly transmitted.

Additionally, for example, when the tunnel connection control unit 233 establishes a tunnel connection, the notification unit 234 generates a connection completion notification reporting that the tunnel connection has been established. Upon receipt of the connection completion notification, the management server 4 makes, to the DB server, a registration such that the tunnel connection with a corresponding M2M-GW apparatus 2 has been established. This can make it easy to determine whether the tunnel connection has been established. Note that a registration destination is not always a DB server, and may be, for example, a storage unit (not illustrated) included in the management server 4.

The relay processing unit 235 relays (transfers) a received packet in accordance with a corresponding relay rule. More specifically, when the received packet is a packet transmitted from the device 6 on the center side, namely, when the packet has been received from the upstream side, the relay processing unit 235 identifies the transfer destination of the received packet by referencing a downstream relay rule. At this time, the transfer destination, namely, the "transfer destination IP address" and the "transfer destination port number" are identified on the basis of the "access NW type", the "access port number" and the "protocol type". Then, the relay processing unit 235 respectively rewrites the destination ID and the destination port number of the header of the received packet (hereinafter referred to also as a packet header) to the identified "transfer destination IP address" and "transfer destination port number", and also rewrites the transmission source ID and the transmission source port number to the IP address and the port number of the local device. Then, the relay processing unit 235 transfers the received packet to the identified transfer destination.

For example, in reference to FIG. 4, when the WAN side has received a packet, the reception port number and the protocol are respectively "10001" and TCP, and the relay processing unit 235 transfers the received packet to a port number "80" of the device having an IP address "192.168.1.4".

In contrast, when the received packet is a packet transmitted from a subordinate device 1, namely, when the packet has been received from the downstream side, the relay processing unit 235 identifies the transfer destination of the received packet by referencing an upstream relay rule. At this time, the transfer destination, namely, the "transfer destination IP address" and the "transfer destination port number" are identified on the basis of the "access NW type", the "access IP address", the "access port number", the "protocol type" and the "transmission source IP address". Then, the relay processing unit 235 respectively rewrites the destination ID and the destination port number of the header of the received packet to the identified "transfer destination IP address" and "transfer destination port number", and also rewrites the transmission source ID and the transmission source port number to the IP address and the port number of the local apparatus. Then, the relay processing unit 235 transfers the received packet to the identified transfer destination.

For example, in reference to FIG. 5, when the LAN side has received the packet, the IP address of the side that has received the packet is "192.168.1.2", the reception port number is "101", the protocol is UDP and the IP address of the transmission source of the received packet is "192.168.1.4", the relay processing unit 235 transfers the received packet to a port number "2002" of the device having an IP address "192.168.0.20". In this embodiment, "192.168.0.20" is the IP address of the access GW apparatus 3. Namely, the relay processing unit 235 changes the port number of the access GW apparatus 3, to which the packet is to be transferred, in accordance with a combination of the subordinate device 1 (the transmission source IP address) of the transmission source, and the protocol type. This enables the access GW apparatus 3 that has received the packet to identify the device 1 of the transmission source of the received packet.

FIG. 6 illustrates an example of a format of the packet header in this embodiment. The packet header in this embodiment includes a "transmission source ID", a "transmission source port number", a "destination ID", a "destination port number", and a "protocol type" as illustrated in FIG. 6.

The "transmission source ID" is an identifier with which a transmission source of a packet is uniquely identifiable, and is an IP address of a transmission source in this embodiment. The "transmission source port number" is a port number of a transmission source of the packet. The "destination ID" is an identifier with which a destination of the packet is uniquely identifiable, and is an IP address of the destination of the packet in this embodiment. The "destination port number" is a port number of the destination of the packet. The "protocol type" is a type of a protocol of the packet.

FIG. 7 is a functional block diagram illustrating a configuration example of the access GW apparatus 3 in this embodiment. The access GW apparatus 3 in this embodiment is a relay apparatus that communicates with the M2M-GW apparatus 2 in each base LAN, and relays a received packet in accordance with a conversion rule. The access GW apparatus 3 in this embodiment includes a communication unit 31, a storage unit 32, and a control unit 33 as illustrated in FIG. 7.

The communication unit 31 includes, for example, a communication module, and communicates with another device. The communication unit 31 receives, for example, a packet transmitted from a device 6 on the center side, or a packet transmitted from a device 1 within each base LAN. Moreover, the communication unit 21 receives, for example, a conversion rule transmitted from the management server 4.

The storage unit 32 includes, for example, a RAM, a ROM, a flash memory or the like. The storage unit 32 functions, for example, as a working area of the MPU included in the control unit 33, a program area for storing various types of programs such as an operation program for controlling the entire access GW apparatus 3, and a data area for storing various types of data.

The storage unit 32 functions also as a conversion rule storage unit 321 as illustrated in FIG. 7. The conversion rule storage unit 321 stores downstream conversion rules used to relay a packet that any of the devices 6 on the center side transmits to any of the devices 1 within abase LAN, and upstream conversion rules used to relay a packet that any of the devices 1 within the base LAN to any of the devices 6 on the center side. FIG. 8 illustrates a configuration example of the downstream conversion rules in this embodiment, while FIG. 9 illustrates a configuration example of the upstream conversion rules in this embodiment.

For example, as illustrated in FIGS. 8 and 9, the conversion rule storage unit 321 respectively puts the downstream conversion rules and the upstream conversion rules into tables, and stores them. The downstream conversion rules in this embodiment are conversion rules that the relay processing unit 334 (to be described in detail later) references when it relays a packet transmitted from any of the devices 6 on the center side to any of the devices 1 within the base LAN, as described above. As illustrated in FIG. 8, the downstream conversion rules in this embodiment are conversion rules that make an association among the "reception destination IP address", the "reception destination port number", the "protocol type", the "transfer destination IP address" and the "transfer destination port number".

The "reception destination IP address" is a destination IP address stored as the destination ID of a received packet (a virtual IP address assigned to a device 1 of the final destination of the received packet in this embodiment). The "reception destination port number" is a destination port number of the received packet (the reception port number of the device 1 of the final destination of the received packet in this embodiment). The "protocol type" is a type of a protocol of a relay target (the received packet).

The "transfer destination IP address" is an IP address of a transfer destination (the WAN side of any of the M2M-GW apparatuses 2 in this embodiment) of the received packet. The "transfer destination port number" is a reception port number of the transfer destination when the received packet is transmitted to the transfer destination.

As described above, the upstream conversion rules in this embodiment are conversion rules that the relay processing unit 334 references when it relays a packet transmitted from any of the devices 1 within the base LAN to any of the devices 6 on the center side. The upstream conversion rules in this embodiment are conversion rules that make an association among the "reception destination IP address", the "reception destination port number", the "protocol type", the "transfer destination IP address", the "transfer destination port number" and the "conversion IP address" as illustrated in FIG. 9.

The "conversion IP address" is a virtual IP address assigned to the device 1 of a transmission source of a received packet. This virtual IP address is stored as the transmission source ID of a packet when the access GW apparatus 3 relays the packet to the upstream side.

The "reception destination IP address" is a destination IP address stored as the destination ID of the received packet (the IP address of the access GW apparatus 3 in this embodiment). The "reception destination port number" is a destination port number (the reception port number of the access GW apparatus 3 in this embodiment) of the received packet. The "protocol type" is a type of a protocol of a relay target (the received packet).

The "transfer destination IP address" is an IP address of the transfer destination (the device 6 in this embodiment) of the received packet. The "transfer destination port number" is a reception port number of the transfer destination when the received packet is transmitted to the transfer destination.

Returning to FIG. 7. The control unit 33 includes, for example, an MPU or the like, and implements functions of a setting unit 331, a notification unit 332, a tunnel connection request unit 333 and the relay processing unit 334 as illustrated in FIG. 7 by executing an operation program stored in the program area of the storage unit 32. Moreover, the control unit 33 executes processes such as a control process for controlling the entire access GW apparatus 3, a conversion rule setting process to be described in detail later, and other processes by executing an operation program.

Upon receipt of a conversion rule, the setting unit 331 processes the received conversion rule in accordance with a process type. When the process type is, for example, a registration, the setting unit 331 additionally registers the received conversion rule to the conversion rule storage unit 321. Alternatively, when the process type is, for example, an update, the setting unit 331 identifies an update target on the basis of the received conversion rule, and rewrites the conversion rule as the update target that is identified and registered in the conversion rule storage unit 321 to the received conversion rule. Further alternatively, when the process type is, for example, a deletion, the setting unit 331 identifies a deletion target on the basis of the received conversion rule, and deletes the identified conversion rule as the deletion target from the conversion rule storage unit 321.

The notification unit 322 generates various types of notifications, and transmits a generated notification to the management server 4 via the communication unit 31.

For example, when the setting unit 331 processes a received conversion rule in accordance with a process type, the notification unit 332 generates a process completion notification reporting that the process of the conversion rule has been completed. Upon receipt of the process completion notification, the management server 4 makes, to the DB server, a registration such that the process of the corresponding conversion rule has been completed. This can prevent the conversion rule from being redundantly transmitted.

In a case where a tunnel connection with the M2M-GW apparatus 2 that accommodates the device 1 of the final destination of the received packet is not established when a packet transmitted from the device 6 on the center side has been received, the tunnel connection request unit 333 gives a connection trigger for automatically establishing a tunnel connection. More specifically, the tunnel connection request unit 333 generates a connection trigger for automatically establishing a tunnel connection with the M2M-GW apparatus 2 identified by the relay processing unit 334, and transmits the generated connection trigger to the management server 4.

When the tunnel connection is, for example, a VPN connection, the tunnel connection request unit 333 generates a connection trigger for establishing a VPN connection with the identified M2M-GW apparatus 2, and transmits the generated connection trigger to the management server 4. Upon receipt of the connection trigger, the management server 4 registers, to the DB server, the connection instruction for the corresponding M2M-GW apparatus 2. Thus, the management server 4 can issue a connection instruction to an M2M-GW apparatus 2 upon receipt of a periodical communication from the M2M-GW apparatus 2 for which the connection instruction is registered in the DB server.

When the tunnel connection is, for example, a PPP connection, the tunnel connection request unit 333 generates a connection trigger for establishing a PPP connection with the identified M2M-GW apparatus 2, and transmits the generated connection trigger to the management server 4. Upon receipt of the connection trigger, the management server 4 transmits, to a carrier server, a transmission request to transmit a connection request instruction to the identified M2M-GW apparatus 2. Then, the carrier server transmits the connection request instruction for establishing a PPP connection to the identified M2M-GW apparatus 2 (the M2M-GW apparatus 2 that accommodates the device 1 of the final destination of the packet). Upon receipt of the connection request instruction, the M2M-GW apparatus 2 establishes the PPP connection by issuing a connection request to the carrier server.

The relay processing unit 334 relays (transfers) the received packet in accordance with a corresponding conversion rule. More specifically, upon receipt of the packet transmitted from the device 6 on the center side (the packet from the upstream side), the relay processing unit 334 identifies the M2M-GW apparatus 2 that accommodates the device 1 of the final destination of the received packet, namely, the M2M-GW apparatus 2 of the transfer destination, by referencing a downstream conversion rule. When the tunnel connection with the identified M2M-GW apparatus 2 has not been established, the relay processing unit 334 discards the received packet.

In contrast, when the tunnel connection with the M2M-GW apparatus 2 that accommodates the device 1 of the final destination of the received packet is established upon receipt of the packet transmitted from the device 6 on the center side (the packet from the upstream side), the relay processing unit 334 identifies the transfer destination (the transfer destination IP address and the transfer destination port number) of the received packet by referencing a downstream conversion rule. At this time, the transfer destination, namely, the "transfer destination IP address" and the "transfer destination port number" are identified on the basis of the "reception destination IP address", the "reception destination port number" and the "protocol type". Then, the relay processing unit 334 respectively rewrites the destination ID and the destination port number of the header of the received packet to the identified "transfer destination IP address" and "transfer destination port number", and also rewrites the transmission source ID and the transmission source port number to the IP address and the port number of the local apparatus. Then, the relay processing unit 334 transfers the received packet to the identified transfer destination.

For example, in reference to FIG. 8, when the destination IP address stored as the destination ID of the received packet, the destination port number of the received packet, and the protocol are respectively "10.10.10.12", "80" and TCP, the relay processing unit 334 transfers the received packet to a port number "10003" of a device having an IP address "192.168.0.3". In this embodiment, "192.168.0.3" is the IP address of the WAN side of the M2M-GW apparatus 2 that accommodates the device 1 to which the virtual IP address "10.10.10.12" is assigned. Namely, the relay processing unit 334 identifies the port number assigned to cause the M2M-GW apparatus 2 to identify the packet addressed to the M2M-GW apparatus 2 of the transfer destination that accommodates the device 1 of the final destination, and the device 1 of the final destination.

In contrast, when the received packet is a packet transmitted from a device 1 within a base LAN, namely, when the packet is received from the downstream side, the relay processing unit 334 identifies the transfer destination (the transfer destination IP address and the transfer destination port number) and the conversion IP address of the received packet by referencing an upstream conversion rule. At this time, the transfer destination and the conversion IP address, namely, the "transfer destination IP address", the "transfer destination port number" and the "conversion IP address" are identified on the basis of the "reception destination IP address", the "reception destination port number" and the "protocol type". Then, the relay processing unit 334 respectively rewrites the destination ID, the destination port number and the transmission source ID of the header of the received packet to the identified "transfer destination IP address", "transfer destination port number" and "conversion IP address", and also rewrites the transmission source port number to the port number of the local apparatus. Then, the relay processing unit 334 transfers the received packet to the identified transfer destination.

For example, in reference to FIG. 9, when the destination IP address stored as the destination ID of the received packet, the destination port number of the received packet, and the protocol are respectively "192.168.0.20", "2003" and TCP in FIG. 9, the relay processing unit 334 transfers the received packet to a port number "200" of a device having an IP address "10.10.20.7". At this time, the relay processing unit 334 rewrites the transmission source IP address stored as the transmission source ID of the received packet to the identified conversion IP address "10.10.10.12". In this embodiment, "10.10.20.7" is the IP address of the device 6, and "10.10.10.12" is a virtual IP address assigned to the device 1 that has transmitted the packet. Namely, the relay processing unit 334 stores, as the transmission source ID, the virtual IP address corresponding to the device 1 that has transmitted the received packet when it relays the packet from the downstream side.

Figure 10:
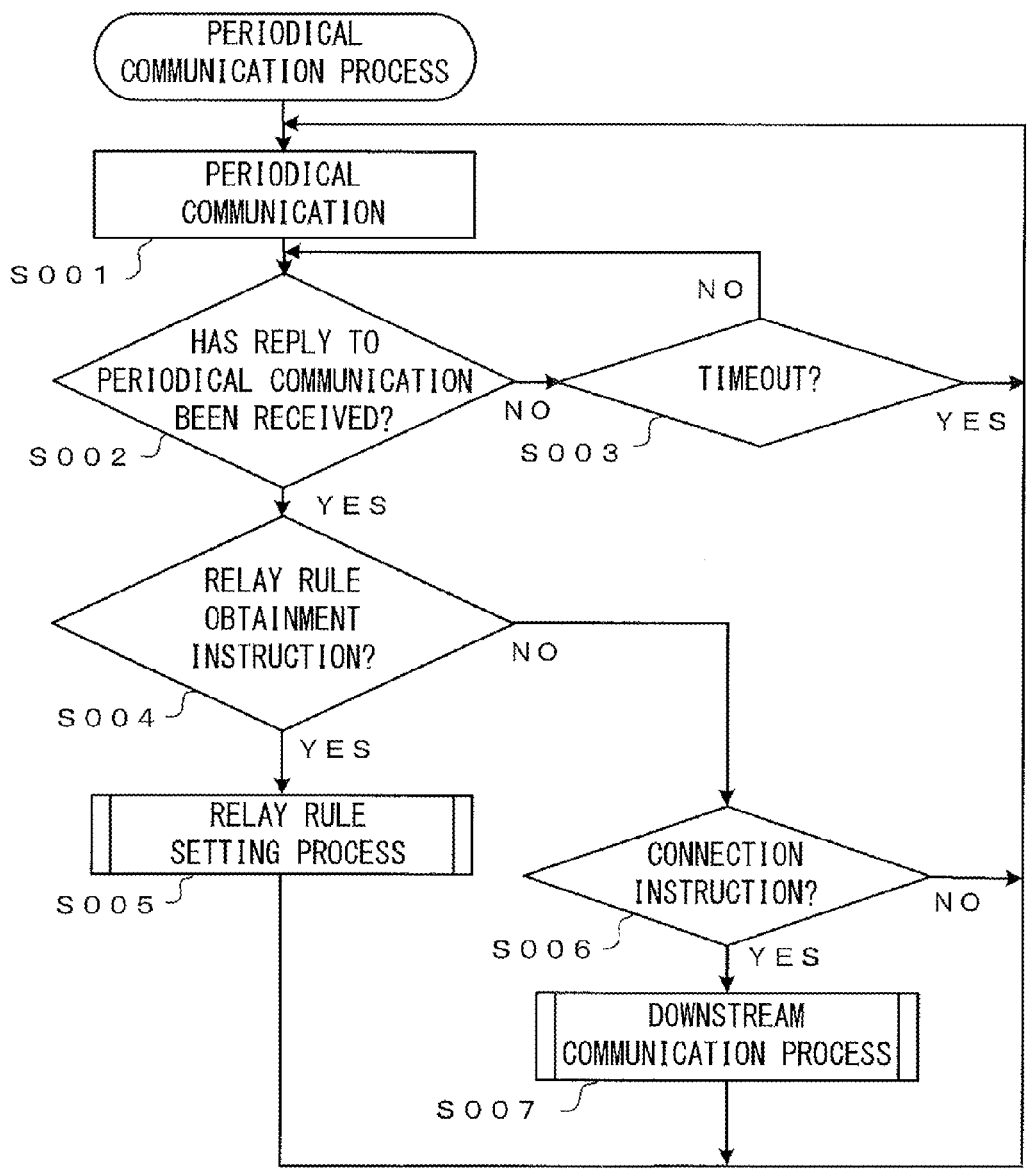
FIG. 10 illustrates an example of a flowchart for explaining a periodical communication process in the embodiment.

A flow of the periodical communication process in this embodiment is described next with reference to FIG. 10. FIG. 10 is a flowchart for explaining the periodical communication process in this embodiment. This periodical communication process is executed by each M2M-GW apparatus 2, and is started by recognizing, as a trigger, that a specified timing of a periodical communication with the management server 4 has been reached.

When the specified timing has been reached, the periodical communication control unit 231 performs a periodical communication with the management server 4 (step S001). Then, the periodical communication control unit 231 determines whether a reply to the periodical communication has been received from the management server 4 (step S002). When the periodical communication control unit 231 determines that the reply to the periodical communication has not been received ("NO" in step S002), it further determines whether a timeout has occurred (step S003).

When the periodical communication control unit 231 determines that the timeout has occurred ("YES" in step S003), the flow returns to the process of step S001, and the above described process is repeated. In contrast, when the periodical communication control unit 231 determines that the timeout has not occurred ("NO" in step S003), the flow returns to the process of step S002, and the above described process is repeated.

When the periodical communication control unit 231 determines that the reply to the periodical communication has been received in the process of step S002 ("YES" in step S002), it further determines whether the reply to the periodical communication is a relay rule obtainment instruction (step S004). When the periodical communication control unit 231 determines that the reply is the relay rule obtainment instruction ("YES" in step S004), the obtainment unit 232 executes a relay rule setting process in cooperation with the notification unit 234 (step S005). Then, the flow returns to the process of step S001, and the above described process is repeated.

In contrast, when the periodical communication control unit 231 determines that the reply is not the relay rule obtainment instruction ("NO" in step S004), the periodical communication control unit 231 further determines whether the reply to the periodical communication is a connection instruction (step S006). When the periodical communication control unit 231 determines that the reply is not the connection instruction ("NO" in step S006), the flow returns to the process of step S001, and the above described process is repeated.

In contrast, when the periodical communication control unit 231 determines that the reply is the connection instruction ("YES" in step S006), the relay processing unit 235 executes a downstream communication process in cooperation with the tunnel connection control unit 233 and the like (step S007). Then, the flow returns to the process of step S001, and the above described process is repeated.

Figure 11:
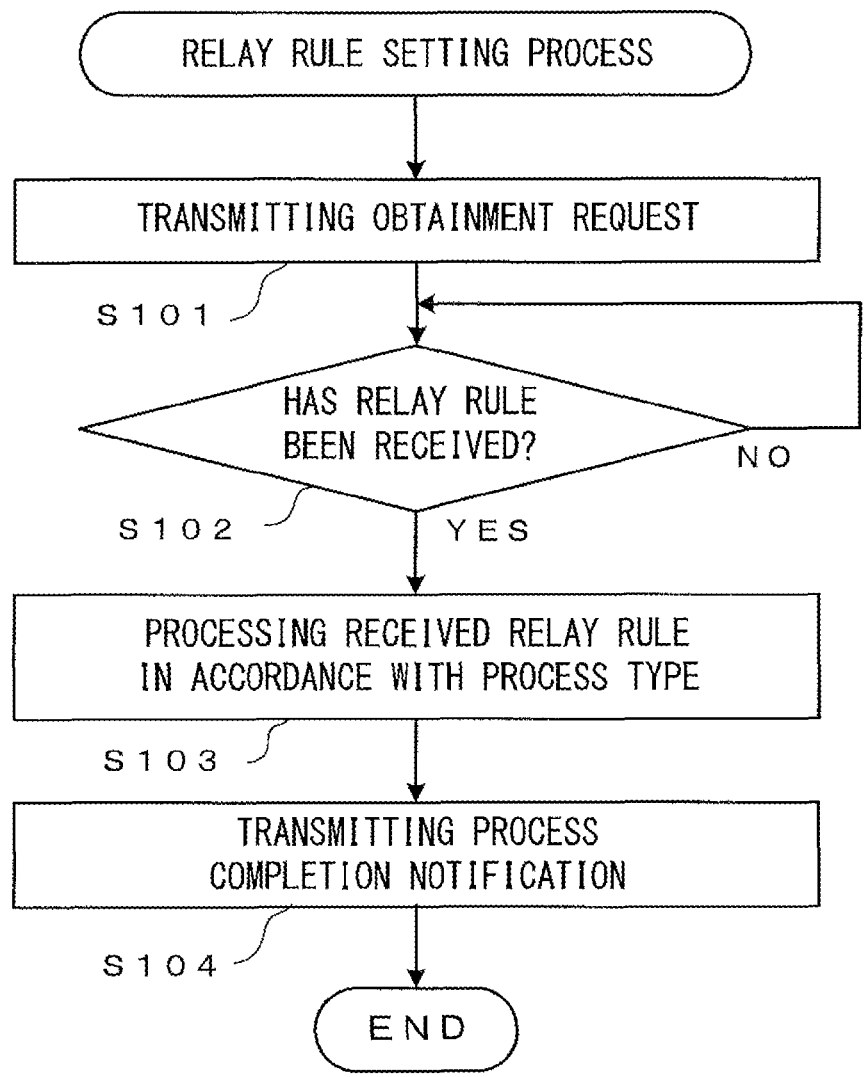
FIG. 11 illustrates an example of a flowchart for explaining a relay rule setting process in the embodiment.

A flow of the relay rule setting process in this embodiment is described next with reference to FIG. 11. FIG. 11 is an example of a flowchart for explaining the relay rule setting process in this embodiment. This relay rule setting process is a process corresponding to the process of step S004 in the periodical communication process.

The obtainment unit 232 generates an obtainment request, and transmits the generated obtainment request to the management server 4 (step S101). Then, the obtainment unit 232 determines whether a relay rule has been received (step S102). When the obtainment unit 232 determines that the relay rule has not been received ("NO" in step S102), the process of step S102 is repeated until the relay rule is received.

In contrast, when the obtainment unit 232 determines that the relay rule has been received ("YES" in step S102), it processes the relay rule in accordance with a process type of the received relay rule (step S103). Then, the notification unit 234 generates a process completion notification, and transmits the generated process completion notification to the management server 4 (step S104). Then, this process is terminated, and the flow moves on to the process of step S001 in the periodical communication process.

Figure 12:
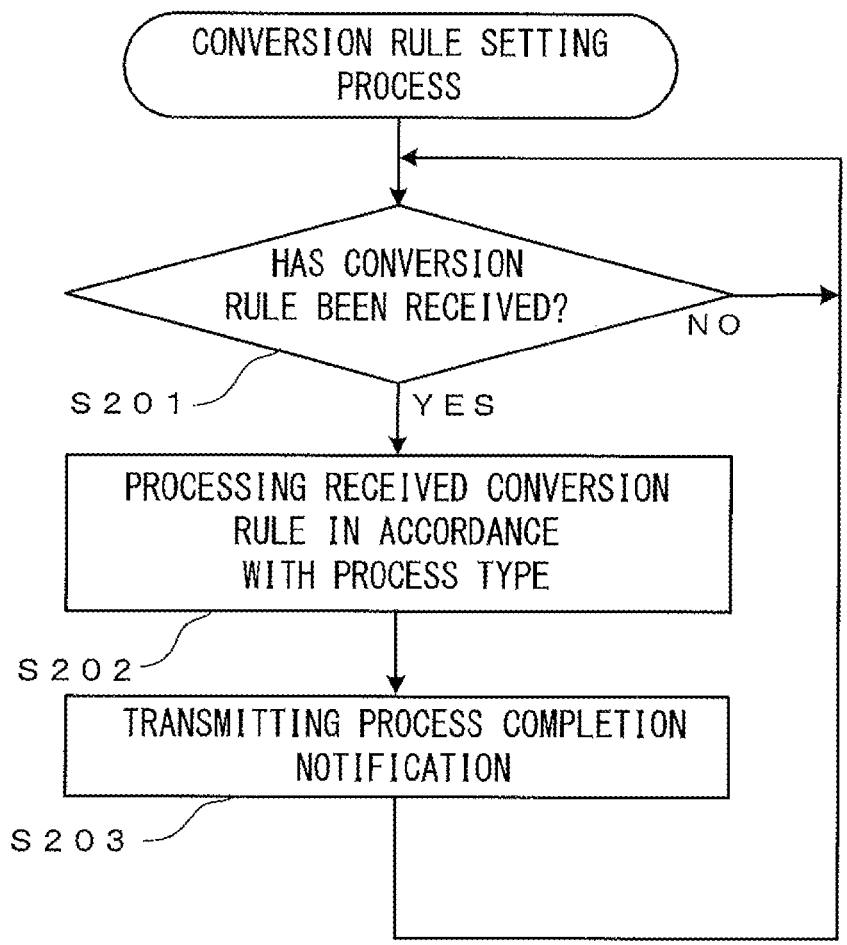
FIG. 12 illustrates an example of a flowchart for explaining a conversion rule setting process in the embodiment.

A flow of the conversion rule setting process in this embodiment is described next with reference to FIG. 12. FIG. 12 is an example of a flowchart for explaining the conversion rule setting process in this embodiment. This conversion rule setting process is executed by the access GW apparatus 3, and is started by recognizing the reception of a conversion rule as a trigger.

The setting unit 331 determines whether a conversion rule has been received (step S201). When the setting unit 331 determines that the conversion rule has not been received ("NO" in step S201), the process of step S201 is repeated to wait for the reception of the conversion rule.

In contrast, when the setting unit 331 determines that the conversion rule has been received ("YES" in step S201), it processes the conversion rule in accordance with a process type of the received conversion rule (step S202). Then, the notification unit 332 generates a process completion notification, and transmits the generated process completion notification to the management server 4 (step S203). Then, the flow returns to the process of step S201, and the above described process is repeated.

Figure 13:
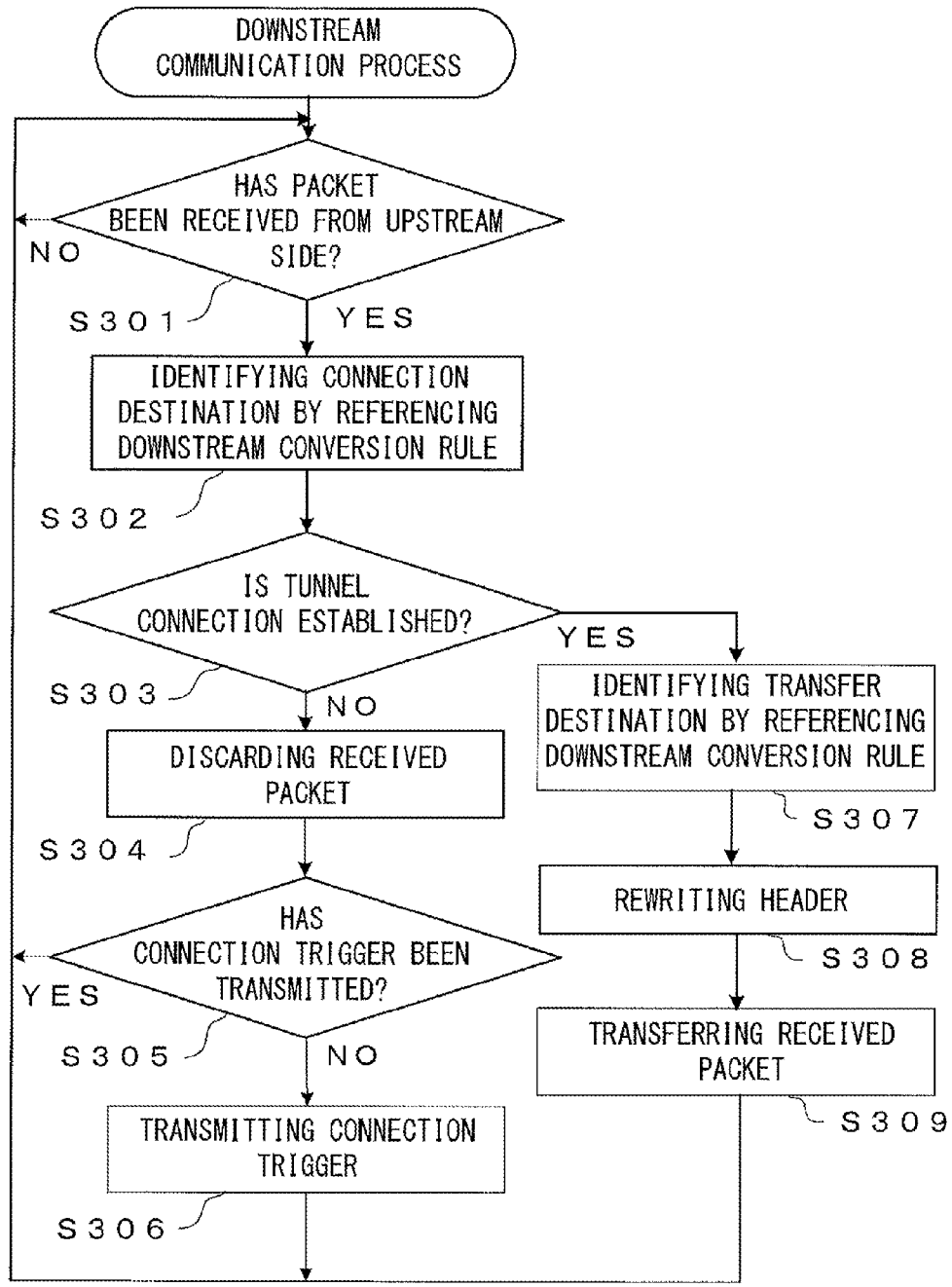
FIG. 13 illustrates an example of a flowchart for explaining a downstream communication process in the access GW apparatus in the embodiment.

A flow of the downstream communication process executed by the access GW apparatus 3 in this embodiment is described next with reference to FIG. 13. FIG. 13 is an example of a flowchart for explaining the downstream communication process executed by the access GW apparatus 3 in this embodiment. This downstream communication process is started by recognizing, as a trigger, the reception of a packet (the packet from any of the devices 6 on the center side) from the upstream side.

The relay processing unit 334 determines whether a packet from the upstream side has been received (step S301). When the relay processing unit 334 determines that the packet from the upstream side has not been received ("NO" in step S301), the process of step S301 is repeated so as to wait for the reception of the packet from the upstream side.

In contrast, when the relay processing unit 334 determines that the packet from the upstream side has been received ("YES" in step S301), the relay processing unit 334 identifies the M2M-GW apparatus 2 of the transfer destination of the received packet by referencing a downstream conversion rule (step S302). Then, the relay processing unit 334 determines whether a tunnel connection with the identified M2M-GW apparatus 2 has been established (step S303). Whether the tunnel connection has been established may be determined, for example, on the basis of whether a connection completion of the corresponding M2M-GW apparatus 2 is registered in the DB server.

When the relay processing unit 334 determines that the tunnel connection has not been established ("NO" in step S303), it discards the received packet (step S304). Then, the tunnel connection request unit 333 determines whether a connection trigger for establishing a tunnel connection with the M2M-GW apparatus 2 identified by the relay processing unit 334 has been transmitted (step S305). When the tunnel connection request unit 333 determines that the connection trigger has been transmitted ("YES" in step S305), the flow returns to the process of step S301, and the above described process is repeated.

In contrast, when the tunnel connection request unit 333 determines that the connection trigger has not been transmitted ("NO" in step S305), it generates a connection trigger for establishing a tunnel connection with the identified M2M-GW apparatus 2, and transmits the generated connection trigger to the management server 4 (step S306). Then, the flow returns to the process of step S301, and the above described process is repeated.

When the tunnel connection request unit 333 determines that the tunnel connection has been established in the process of step S303 ("YES" in step S303), the relay processing unit 334 identifies the transfer destination (the transfer destination IP address and the transfer destination port number) of the received packet by referencing a downstream conversion rule (step S307).

Then, the relay processing unit 334 respectively rewrites the destination ID and the destination port number of the header of the received packet to the identified "transfer destination IP address" and "transfer destination port number, and also rewrites the transmission source ID and the transmission source port number to the IP address and the port number of the local apparatus (step S308). Then, the relay processing unit 334 transfers the received packet to the identified transfer destination (the M2M-GW apparatus 2 that accommodates the device 1 of the final destination of the received packet in this embodiment) via the connected tunnel (step S309). Then, the flow returns to the process of step S301, and the above described process is repeated.

Figure 14:
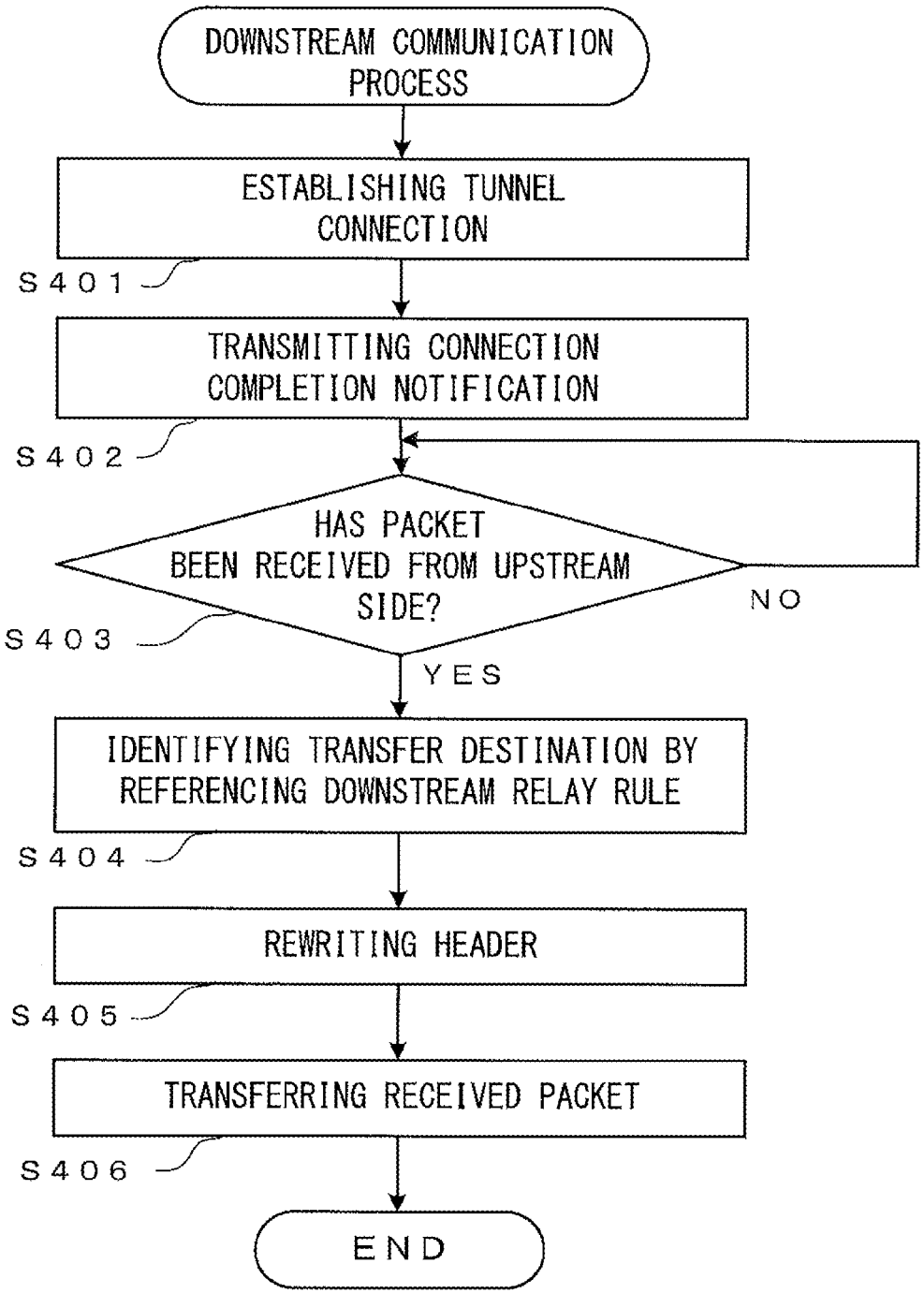
FIG. 14 illustrates an example of a flowchart for explaining a downstream communication process in the M2M-GW apparatus in the embodiment.

A flow of the downstream communication process executed by the M2M-GW apparatus 2 in this embodiment is described next with reference to FIG. 14. FIG. 14 is an example of a flowchart for explaining the downstream communication process executed by the M2M-GW apparatus 2 in this embodiment. This downstream communication process is a process corresponding to the process of step S007 in the periodical communication process, or a downstream communication process executed upon receipt of a connection request instruction from a carrier server. A case where this downstream communication process corresponds to the process of step S007 in the periodical communication process is described below.

The tunnel connection control unit 233 establishes a tunnel connection (step S401). Then, the notification unit 234 generates a connection completion notification, and transmits the generated connection completion notification to the management server 4 (step S402). Then, the relay processing unit 235 determines whether a packet (the packet from the upstream side) has been received from any of the devices 6 on the center side (step S403). Namely, the relay processing unit 235 determines whether the packet transferred from the access GW apparatus 3 has been received.

When the relay processing unit 235 determines that the packet from the upstream side has not been received ("NO" in step S403), the process of step S403 is repeated until the packet from the upstream side is received. In contrast, when the relay processing unit 235 determines that the packet from the upstream side has been received ("YES" in step S403), the relay processing unit 235 identifies a transfer destination (the transfer destination IP address and the transfer destination port number) by referencing a downstream relay rule (step S404).

Then, the relay processing unit 235 respectively rewrites the destination ID and the destination port number of the header of the received packet to the identified "transfer destination IP address" and "transfer destination port number", and also rewrites the transmission source ID and the transmission source port number to the IP address and the port number of the local apparatus (step S405). Next, the relay processing unit 235 transfers the received packet to the identified transfer destination (the subordinate device 1, which is the final destination of the received packet in this embodiment) (step S406). Then, this process is terminated, and the flow moves on to the process of step S001 in the periodical communication process.

Figure 15:
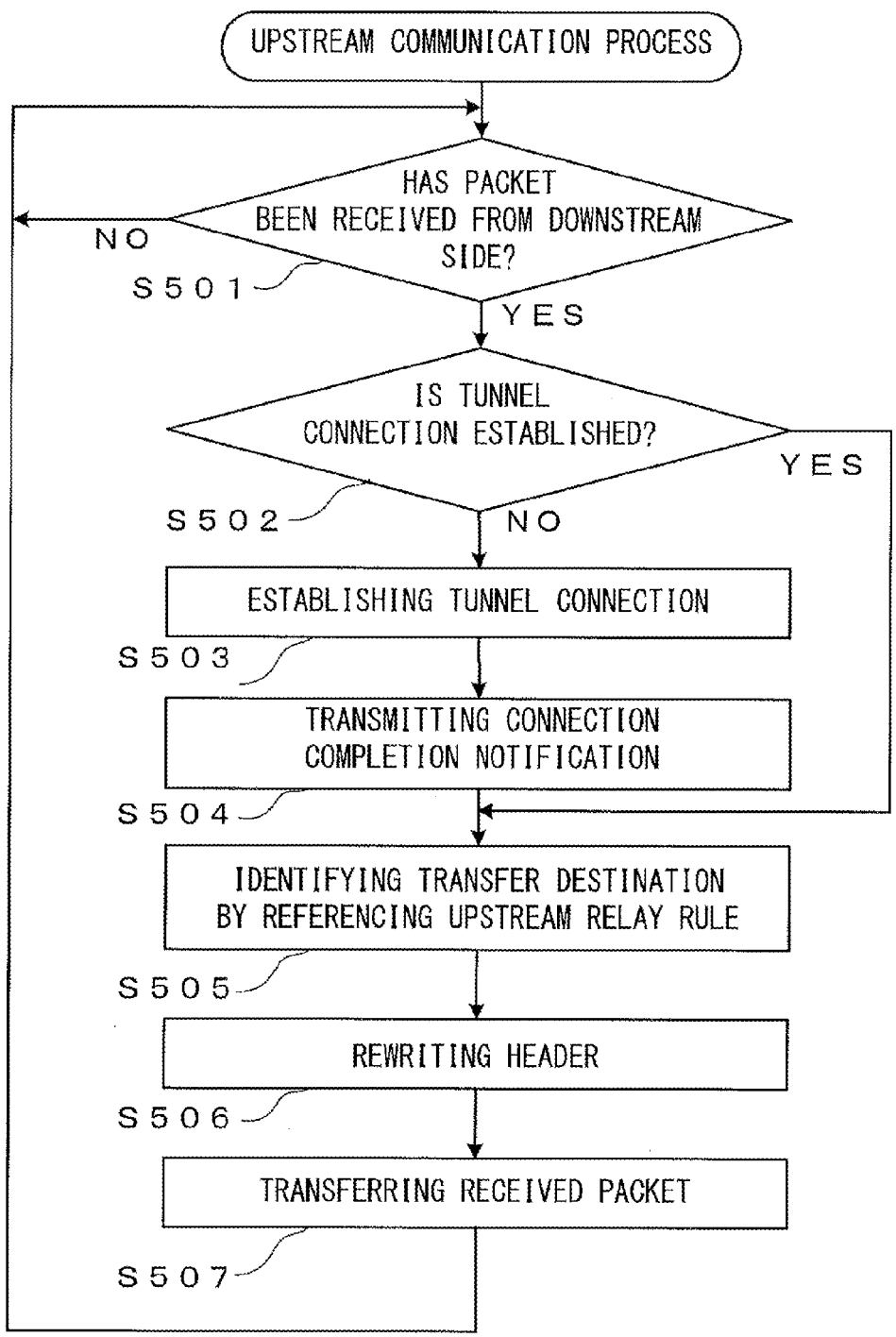
FIG. 15 illustrates an example of a flowchart for explaining an upstream communication process in the M2M-GW apparatus in the embodiment.

A flow of the upstream communication process executed by the M2M-GW apparatus 2 in this embodiment is described next with reference to FIG. 15. FIG. 15 is an example of a flowchart for explaining the upstream communication process executed by the M2M-GW apparatus 2 in this embodiment. This upstream communication process is executed by each M2M-GW apparatus 2, and is started by recognizing, as a trigger, the reception of a packet from a subordinate device 1 (the packet from the downstream side).

The tunnel connection control unit 233 determines whether a packet from the downstream side has been received (step S501). When the tunnel connection control unit 233 determines that the packet from the downstream side has not been received ("NO" In step S501), the process of step S501 is repeated so as to wait for the reception of the packet from the downstream side.

In contrast, when the tunnel connection control unit 233 determines that the packet from the downstream side has been received ("YES" in step S501), it further determines whether a tunnel connection has been established (step S502). When the tunnel connection control unit 233 determines that the tunnel connection has been established ("YES" in step 502), the flow proceeds to the process of step S505 to be described later.

In contrast, when the tunnel connection control unit 233 determines that the tunnel connection has not been established ("NO" in step S502), it establishes the tunnel connection (step S503). Then, the notification unit 234 generates a connection completion notification, and transmits the generated connection completion notification to the management server 4 (step S504).

Next, the relay processing unit 235 identifies a transfer destination (the transfer destination IP address and the transfer destination port number) by referencing an upstream relay rule (step S505). Then, the relay processing unit 235 respectively rewrites the destination ID and the destination port number of the header of the received packet to the identified "transfer destination IP address" and "transfer destination port number", and also rewrites the transmission source ID and the transmission source port number to the IP address and the port number of the local apparatus (step S506). Then, the relay processing unit 235 transfers the received packet to the identified transfer destination (the access GW apparatus 3 in this embodiment) via the connected tunnel (step S507). Then, the flow returns to the process of step S501, and the above described process is repeated.

Figure 16:
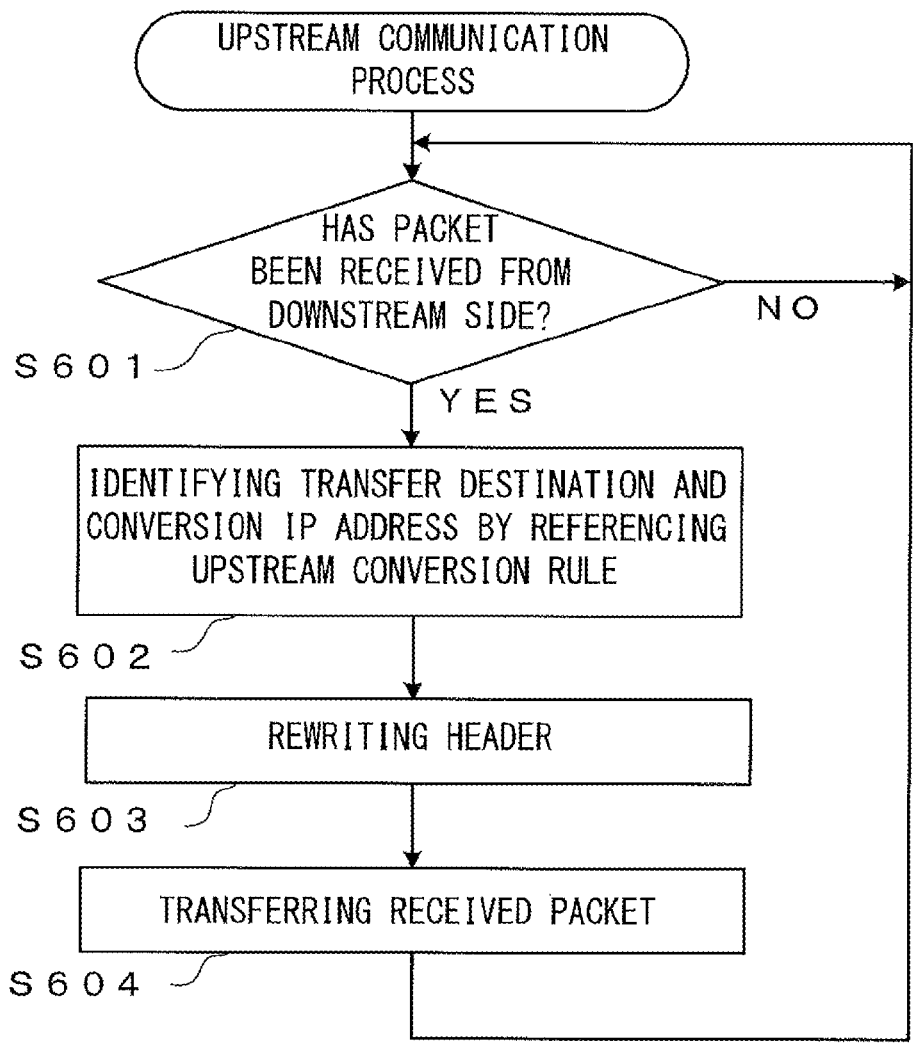
FIG. 16 illustrates an example of a flowchart for explaining an upstream communication process in the access GW apparatus in the embodiment.

A flow of the upstream communication process executed by the access GW apparatus 3 in this embodiment is described next with reference to FIG. 16. FIG. 16 is an example of a flowchart for explaining the upstream communication process executed by the access GW apparatus 3 in this embodiment. This upstream communication process is started by using, as a trigger, the reception of a packet transferred by the M2M-GW apparatus 2 (the packet from the downstream side).

The relay processing unit 334 determines whether a packet from the downstream side has been received (step S601). When the relay processing unit 334 determines that the packet from the downstream side has not been received ("NO" in step S601), the process of step S601 is repeated so as to wait for the reception of the packet from the downstream side.

In contrast, when the relay processing unit 334 determines that the packet from the downstream side has been received ("YES" in step S601), it identifies a transfer destination (the transfer destination IP address and the transfer destination port number) by referencing the upstream conversion rules (step S602). Next, the relay processing unit 334 respectively rewrites the destination ID, the destination port number and the transmission source ID of the header of the received packet to the identified "transfer destination IP address", "transfer destination port number" and "conversion IP address", and also rewrites the transmission source port number to the port number of the local apparatus (step S603).

Then, the relay processing unit 334 transfers the received packet to the identified transfer destination (the device 6 of the final destination of the received packet in this embodiment) (step S604). Next, the flow returns to the process of step S601, and the above described process is repeated.

Figure 17:
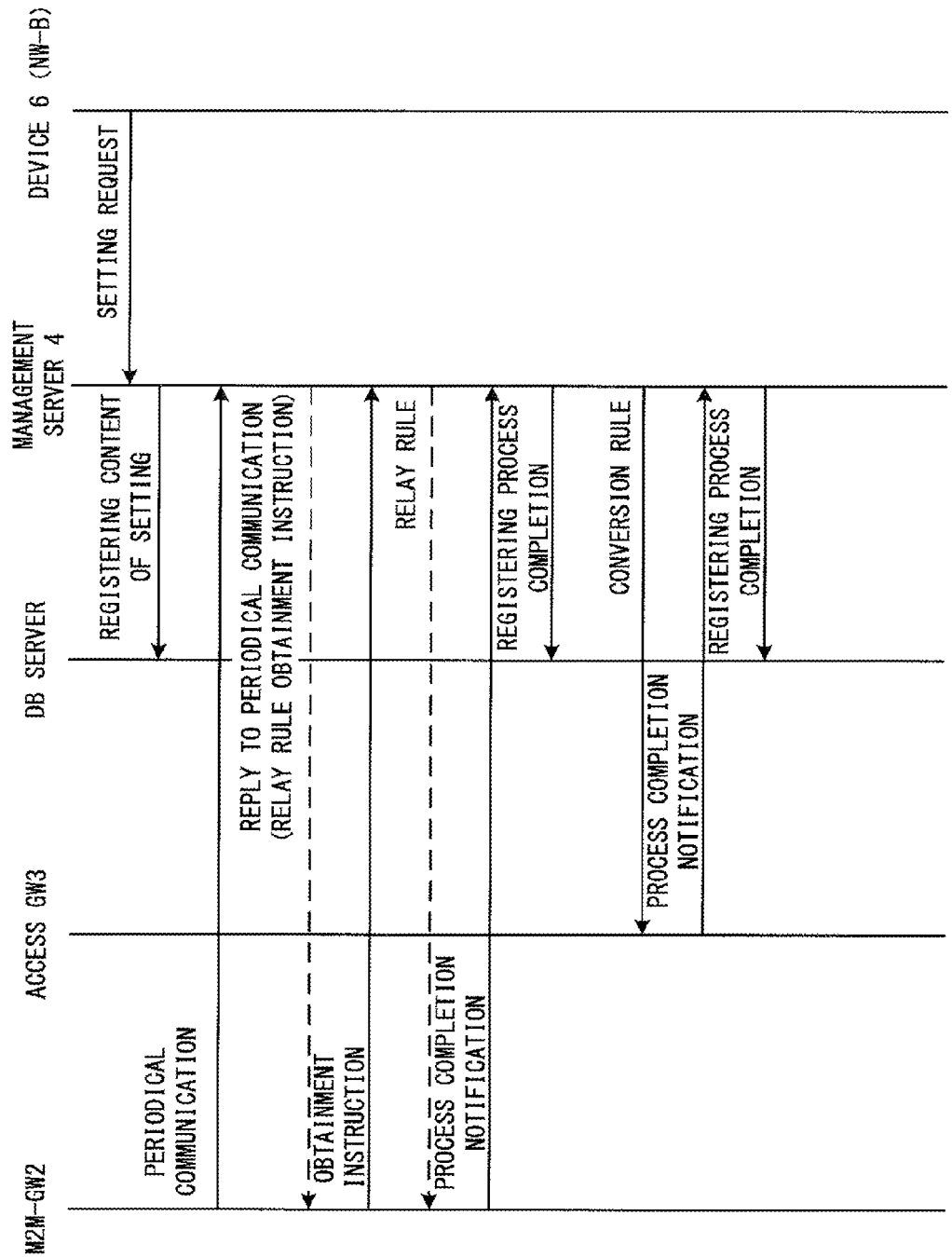
FIG. 17 illustrates an example of a schematic flow diagram of a process for setting a relay rule and a conversion rule in the entire network in the embodiment.

A flow of a process for setting a relay rule and a conversion rule in the entire network 100 in this embodiment is described next with reference to FIG. 17. FIG. 17 illustrates an example of a schematic flow diagram of the process for setting a relay rule and a conversion rule in the entire network 100 in this embodiment.

In a device 6 on the center side, when for example performing setting according to the setting screen of the relay rules and transformation rules that are displayed on the screen of the browser, a setting request including contents of settings is transmitted to the management server 4. Upon receipt of the setting request, the management server 4 registers the contents of settings to the DB server.

Each M2M-GW apparatus 2 performs a periodical communication with the management server 4 when a specified time has been reached. Upon receipt of the periodical communication, the management server 4 references the DB server, and transmits a relay rule obtainment instruction as a reply to the periodical communication when a relay rule (content of a setting) for the M2M-GW apparatus 2 of the transmission source of the received periodical communication is registered.

The M2M-GW apparatus 2 that has received the relay rule obtainment instruction transmits an obtainment request to the management server 4 so as to obtain the relay rule. Upon receipt of the obtainment request, the management server 4 returns the relay rule (including a process type) generated on the basis of the content of the setting. Upon receipt of the relay rule, the M2M-GW apparatus 2 processes the received relay rule in accordance with the process type, and transmits a process completion notification to the management server 4.

Upon receipt of the process completion notification, the management server 4 registers, to the DB server, a process completion indicating that the process of the corresponding relay rule has been completed.

As for the conversion rule, after the management server 4 registers the conversion rule (content of a setting) to the DB server, it transmits, to the access GW apparatus 3, a conversion rule (including a process type) generated on the basis of the content of the setting. Upon receipt of the conversion rule, the access GW apparatus 3 processes the received conversion rule in accordance with the process type, and transmits a process completion notification to the management server 4.

Upon receipt of the process completion notification, the management server 4 registers, to the DB server, a process completion indicating that the process of the corresponding conversion rule has been completed.

Figure 18:
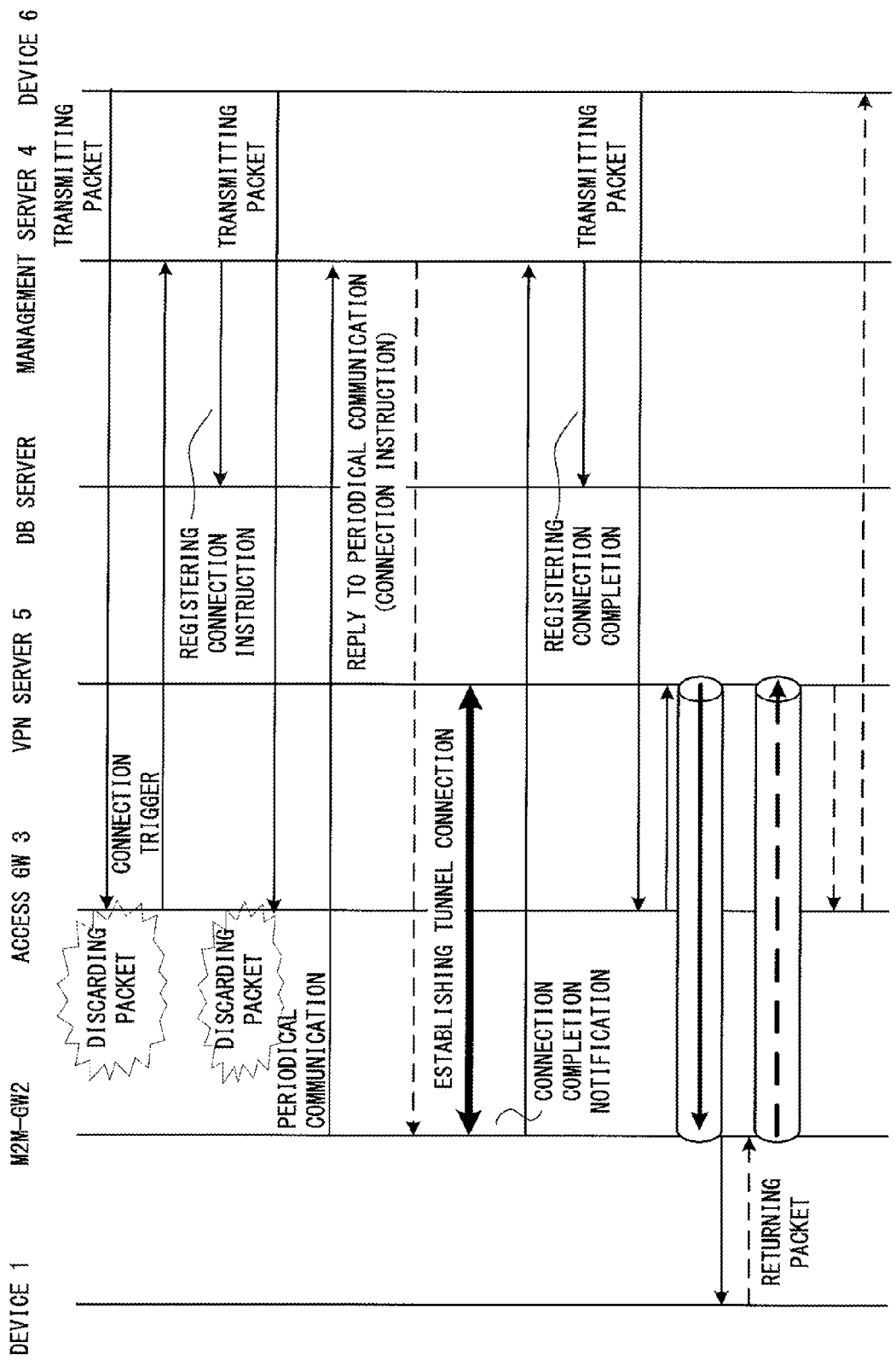
FIG. 18 illustrates an example of a schematic flow diagram of a process executed in the entire network when a communication from a downstream side to an upstream side is performed in the embodiment.

A schematic flow of a process executed when a communication from the downstream side to the upstream side in the entire network 100 in this embodiment is performed is described next with reference to FIG. 18. FIG. 18 illustrates an example of the schematic flow diagram of the process executed in the entire network 100 in this embodiment when the communication from the downstream side to the upstream side is performed.

This specific example assumes that the transmission source ID (transmission source IP address), the transmission port number, the protocol type, the destination ID (destination IP address) and the destination port number of a packet transmitted from the device 6 on the center side are "10.10.20.7", "200", TCP, "10.10.10.10" and "80", respectively. This example also assumes that the access GW apparatus 3 relays a received packet in accordance with the downstream conversion rule and the upstream conversion rule respectively illustrated in FIGS. 8 and 9. This example further assumes that the M2M-GW apparatus 2 accommodating the device 1 of the final destination of the packet transmitted from the device 6 relays the received packet in accordance with the downstream relay rule and the upstream relay rule respectively illustrated in FIGS. 4 and 5. This specific example is the example in a case where a tunnel connection is a VPN connection.

The device 6 transmits the above described packet to the access GW apparatus 3. Assuming that the VPN connection with the M2M-GW apparatus 2 of the transfer destination is not established upon receipt of the packet, the access GW apparatus 3 discards the received packet. Then, the access GW apparatus 3 transmits a connection trigger to the management server 4. Upon receipt of the connection trigger, the management server 4 registers, to the DB server, a connection instruction for the M2M-GW apparatus 2 of the transfer destination.

Since the device 6 cannot receive a reply (a packet) within a specified time period, it retransmits the packet. Since the VPN connection has not been established, the access GW apparatus 3 discards the received packet.

When a specified timing has been reached in the M2M-GW apparatus 2 of the transfer destination, the M2M-GW apparatus 2 performs a periodical communication with the management server 4. Upon receipt of the periodical communication, the management server 4 returns a connection instruction as a reply to the periodical communication. This is because the connection instruction is registered in the DB server.

Upon receipt of the connection instruction, the M2M-GW apparatus 2 establishes the VPN connection, and transmits a connection completion notification to the management server 4. Upon receipt of the connection completion notification, the management server 4 registers the connection completion to the DB server.

Since the device 6 cannot receive a reply (a packet) within the specified time period, it retransmits the packet. The access GW apparatus 3 relays (transfers) the received packet by referencing the downstream conversion rule. This is because the VPN connection has been established. In this specific example, the destination IP address, the destination port number and the protocol type of the received packet are "10.10.10.10", "80" and TCP, respectively. Accordingly, the access GW apparatus 3 identifies the transfer destination IP address "192.168.0.3" and the transfer destination port number "10001" by referencing the downstream conversion rule illustrated in FIG. 8. In this specific example, "192.168.0.3" is the IP address on the WAN side of the M2M-GW apparatus 2. Namely, the access GW apparatus 3 relays (transfers) the received packet to the M2M-GW apparatus 2 having the IP address "192.168.0.3" on the WAN side.

Upon receipt of the packet, the M2M-GW apparatus 2 relays (transfers) the received packet by referencing the downstream relay rule. In this specific example, the packet is received from the WAN side, and the destination port number and the protocol type of the received packet are "10001" and TCP, respectively. Accordingly, the M2M-GW apparatus 2 identifies the transfer destination IP address "192.168.1.4" and the transfer destination port number "80" by referencing the downstream relay rule illustrated in FIG. 4. In this specific example, "192.168.1.4" is the IP address of the device 1 of the final destination of the packet transmitted from the device 6, and the IP address "10.10.10.10" stored as the destination ID of the packet transmitted from the device 6 is a virtual IP address assigned to the device 1.

Namely, even if the destination port number of the M2M-GW apparatus 2 that accommodates the device 1 of the destination cannot be changed, the device 6 can deliver the packet to the device 1 of the destination by using the destination port number as a port number corresponding to a protocol type, and by transmitting the packet to a virtual IP address assigned to the device 1 of the destination.

Upon receipt of the packet, the device 1 transmits, to the M2M-GW apparatus 2 that accommodates the local apparatus 1, the packet including as a payload information according to content of an inquiry so that the packet can be returned to the device 6.

Upon receipt of the packet, the M2M-GW apparatus 2 relays (transfers) the received packet by referencing the upstream relay rule. This specific example assumes that the packet is received from the LAN side, and the destination IP address, the destination port number, the protocol type, and the transmission source IP address of the received packet are "192.168.1.2", "100", TCP and "192.168.1.4", respectively. In this case, the M2M-GW apparatus 2 identifies the transfer destination IP address "192.168.0.20" and the transfer destination port number "2001" by referencing the upstream relay rule illustrated in FIG. 5. In this specific example, "192.168.0.20" is the IP address of the access GW apparatus 3. Namely, the M2M-GW apparatus 2 relays (transfers) the received packet to the access GW apparatus 3 via the tunnel.

Upon receipt of the packet, the access GW apparatus 3 relays (transfers) the received packet by referencing the upstream conversion rule. In this specific example, the destination IP address, the destination port number, and the protocol type of the received packet are "192.168.0.20", "2001" and TCP, respectively. Accordingly, the access GW apparatus 3 identifies the transfer destination IP address "10.10.20.7", the transfer destination port number "200" and the conversion IP address "10.10.10.10" by referencing the upstream conversion rule illustrated in FIG. 9. In this specific example, "10.10.20.7" is the IP address of the device 6 that has transmitted the packet, as described above. Namely, the access GW apparatus 3 relays (transfers) the packet returned from the device 1 to the device 6 that has transmitted the packet addressed to the device 1. At this time, the virtual IP address assigned to the device 1 that has returned the packet is stored as the transmission source IP address of the packet.

Figure 19:
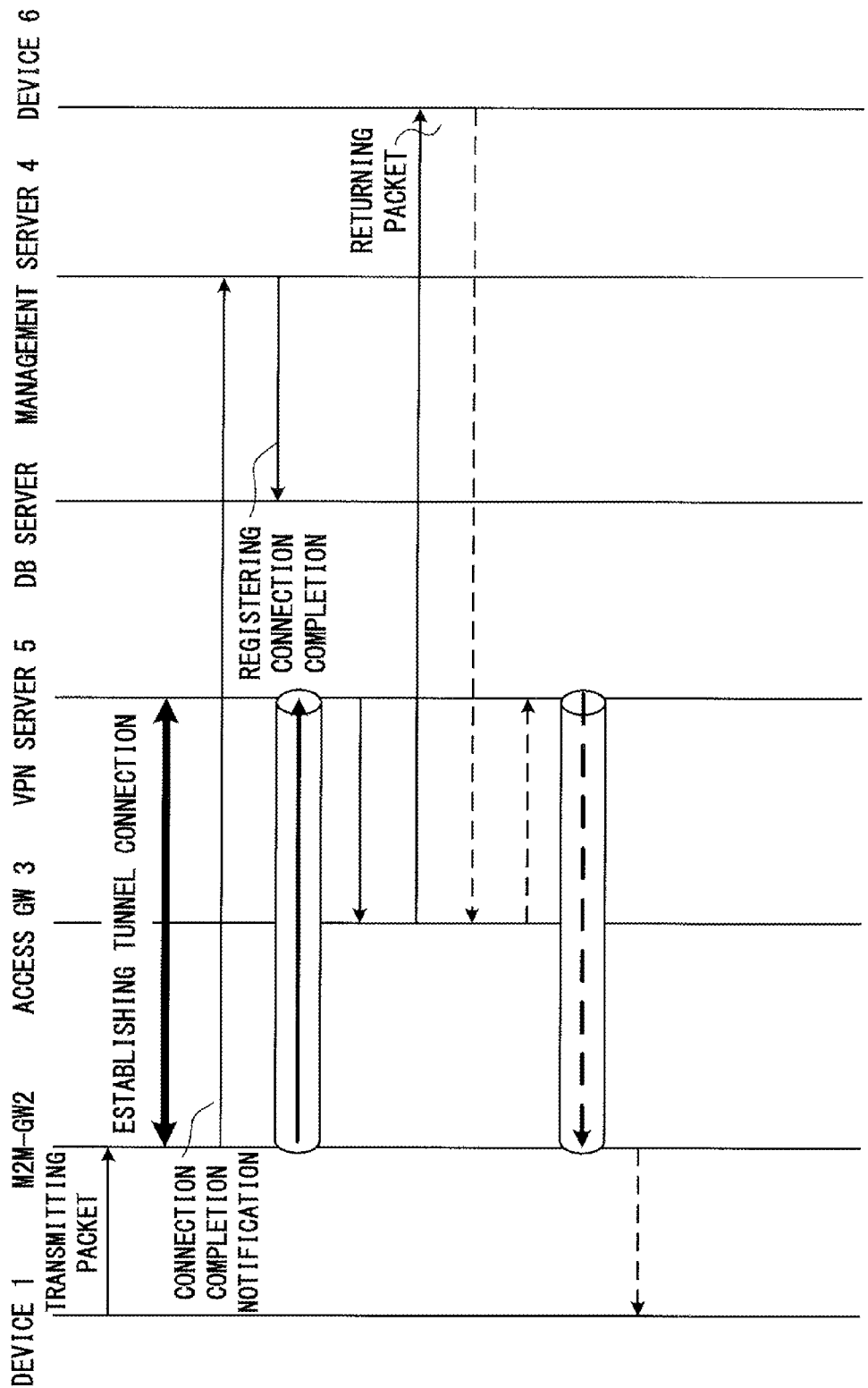
FIG. 19 illustrates an example of a schematic flow diagram of a process executed in the entire network when a communication from the upstream side to the downstream side is performed in the embodiment.

A schematic flow of a process executed when there is a communication from the upstream side to the downstream side in the entire network 100 in this embodiment is described next with reference to FIG. 19. FIG. 19 illustrates an example of the schematic flow of the process executed in the entire network 100 in this embodiment when the communication from the upstream side to the downstream side is performed.

This specific example assumes that the transmission source ID (transmission source IP address), the protocol type, the destination ID (the destination IP address) and the destination port number of a packet transmitted from the device 1 are "192.168.1.4", TCP, "192.168.1.2" and "100", respectively. This specific example also assumes that the M2M-GW apparatus 2 accommodating the device 1 that transmits the packet relays a received packet in accordance with the downstream relay rule and the upstream relay rule respectively illustrated in FIGS. 4 and 5. This specific example further assumes that the access GW apparatus 3 relays the received packet in accordance with the downstream conversion rule and the upstream conversion rule respectively illustrated in FIGS. 8 and 9. This specific example is the example in a case where the tunnel connection is a VPN connection.

The device 1 transmits the above described packet to the M2M-GW apparatus 2. When the VPN connection is not established upon receipt of the packet, the M2M-GW apparatus 2 establishes the VPN connection, and transmits a connection completion notification to the management server 4. Upon receipt of the connection completion notification, the management server 4 registers a connection completion to the DB server.

When the VPN connection has been established, the M2M-GW apparatus 2 relays (transfers) the received packet by referencing the upstream relay rule. In this specific example, the packet is received from the LAN side, and the destination IP address, the destination port number, the protocol type and the transmission source IP address of the received packet are "192.168.1.2", "100", TCP and "192.168.1.4", respectively. Accordingly, the M2M-GW apparatus 2 identifies the transfer destination IP address "192.168.0.20" and the transfer destination port number "2001" by referencing the upstream relay rule illustrated in FIG. 5. In this specific example, "192.168.0.20" is the IP address of the access GW apparatus 3. Namely, the M2M-GW apparatus 2 relays (transfers) the received packet to the access GW apparatus 3 via the tunnel.

Upon receipt of the packet, the access GW apparatus 3 relays (transfers) the received packet by referencing the upstream conversion rule. In this specific example, the destination IP address, the destination port number, and the protocol type of the received packet are "192.168.0.20", "2001", and TCP, respectively. Accordingly, the access GW apparatus 3 identifies the transfer destination IP address "10.10.20.7", the transfer destination port number "200" and the conversion IP address "10.10.10.10" by referencing the upstream conversion rule illustrated in FIG. 9. In this specific example, "10.10.20.7" is the IP address of the device 6 at the final destination of the packet. Namely, the access GW apparatus 3 relays (transfers) the packet transmitted from the device 1 to the device 6 of the final destination. At this time, a virtual IP address assigned to the device 1 that has transmitted the packet is stored as the transmission source IP address of the packet.

Upon receipt of the packet, the device 6 transmits, to the access GW apparatus 3, the packet including, as a payload, information according to content of an inquiry so that the packet can be returned to the device 1 as a reply. In this specific example, the destination IP address, the destination port number and the protocol type of the packet at this time are "10.10.10.10", "80" and TCP, respectively.

Upon receipt of the packet, the access GW apparatus 3 relays (transfers) the received packet by referencing the downstream conversion rule. In this specific example, the destination IP address, the destination port number, and the protocol type of the received packet are "10.10.10.10", "80" and TCP, respectively. Accordingly, the access GW apparatus 3 identifies the transfer destination IP address "192.168.0.3" and the transfer destination port number "10001" by referencing the downstream conversion rule illustrated in FIG. 8. In this specific example, "192.168.0.3" is a WAN side IP address of the M2M-GW apparatus 2. Namely, the access GW apparatus 3 relays (transfers), via the tunnel, the received packet to the M2M-GW apparatus 2 having the WAN side IP address "192.168.0.3".

Upon receipt of the packet, the M2M-GW apparatus 2 relays (transfers) the received packet by referencing the downstream relay rule. In this specific example, the packet is received from the WAN side, and the destination port number and the protocol type of the received packet are "10001" and TCP, respectively. Accordingly, the M2M-GW apparatus 2 identifies the transfer destination IP address "192.168.1.4" and the transfer destination port number "80" by referencing the downstream relay rule illustrated in FIG. 4. In this specific example, "192.168.1.4" is the IP address of the device 1 of the final destination of the packet returned from the device 6 as a reply, and "10.10.10.10" is the virtual IP address assigned to the device 1.

Namely, even if the destination port number of the M2M-GW apparatus 2 that accommodates the device 1 of the destination cannot be changed, the device 6 can deliver the packet to the device 1 of the destination by using the destination port number as a port number corresponding to the protocol type, and by transmitting the packet to a virtual IP address assigned to the device 1 of the destination.

Figure 20:
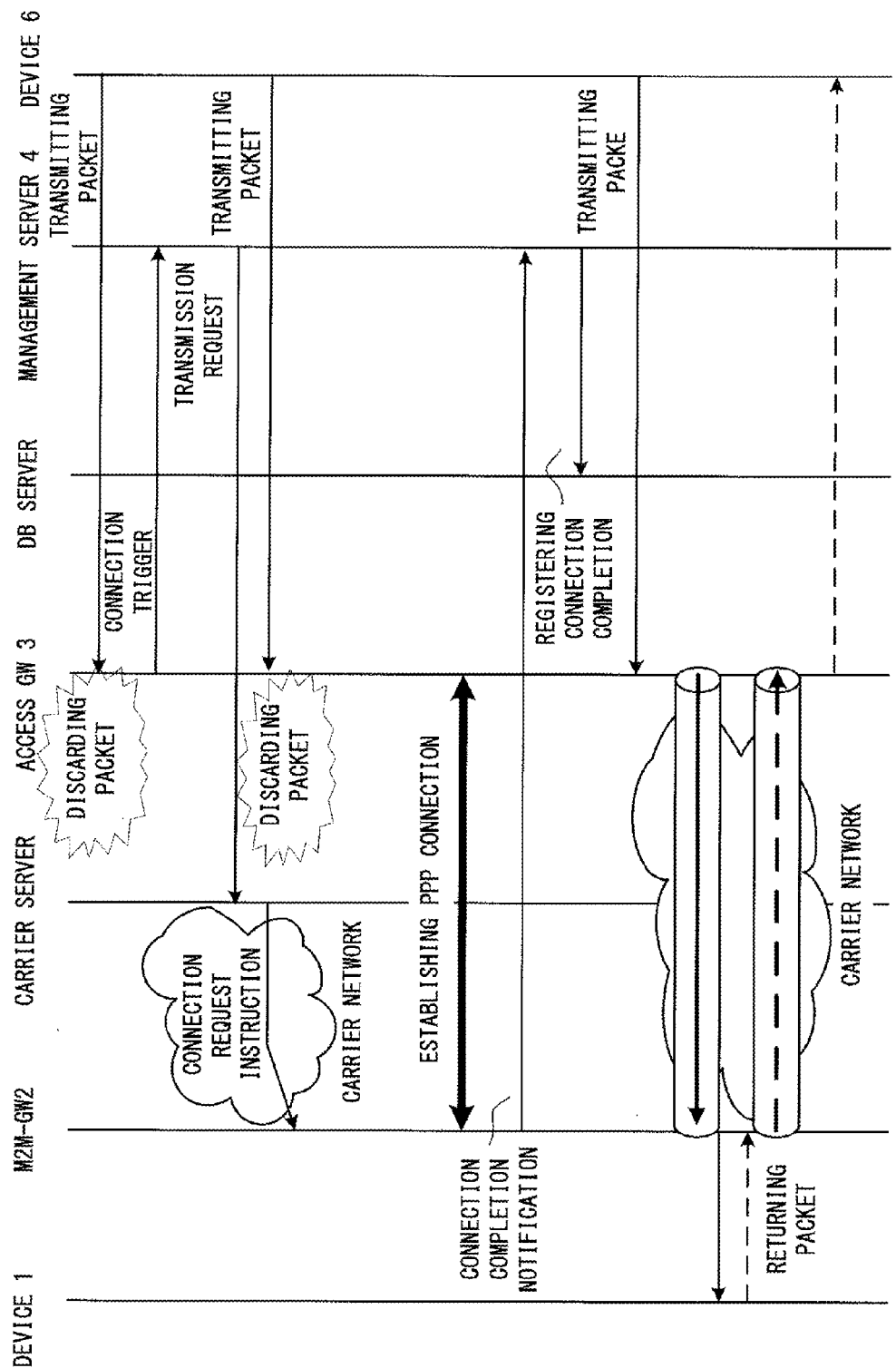
FIG. 20 illustrates an example of a schematic flow diagram of a process executed in the entire network in a case of a PPP connection in the embodiment.

A flow of a process executed in the entire network 100 in a case of a PPP connection in this embodiment is described next with reference to FIG. 20. FIG. 20 illustrates an example of a schematic flow of the process executed in the entire network 100 in the case of the PPP connection in this embodiment. FIG. 20 illustrates the example of the case where a communication from the downstream side to the upstream side is performed.

The device 6 transmits a packet to the access GW apparatus 3. When a PPP connection with the M2M-GW apparatus 2 of the transfer destination is not established upon receipt of the packet, the access GW apparatus 3 discards the received packet. Then, the access GW apparatus 3 transmits a connection trigger to the management server 4. Upon receipt of the connection trigger, the management server 4 transmits, to a carrier server, a transmission request to transmit a connection request instruction.

Since the device 6 cannot receive a reply (a packet) within a specified time period, it retransmits the packet. Since the PPP connection has not been established, the access GW apparatus 3 discards the received packet.

Upon receipt of the transmission request, the carrier server transmits a connection request instruction to the M2M-GW apparatus 2 of the transfer destination. Upon receipt of the connection request instruction, the M2M-GW apparatus 2 establishes the PPP connection, and transmits a connection completion notification to the management server 4. Upon receipt of the connection completion notification, the management server 4 registers a connection completion to the DB server.

Since a reply (a packet) cannot be received within the specified time period, it retransmits the packet. Since the PPP connection has been established, the access GW apparatus 3 relays (transfers) the received packet by referencing the downstream conversion rule. A subsequent flow of the process is the same as that in the case where the tunnel connection is the VPN connection.

According to the above described embodiment, the access GW apparatus 3 identifies a port number assigned to cause an M2M-GW apparatus 2 to identify a packet addressed to the M2M-GW apparatus 2 of a transfer destination that accommodates a device 1 of the final destination, and addressed to the device 1 of the final destination, on the basis of a virtual IP address (conversion IP address) that is stored in a header of the packet and assigned to the device 1 of the final destination of the packet, when the access GW apparatus 3 relays the packet from the upstream side. Then, the access GW apparatus 3 transfers the received packet to the identified port number of the identified M2M-GW apparatus 2. Thus, the access GW apparatus suitably relays the packet to the M2M-GW apparatus 2. Therefore, even if a transmission port number of the M2M-GW apparatus 2 that accommodates the device 1 of the final destination of the packet cannot be changed, the device 6 on the center side (the device on the upstream side) can perform an N-to-N communication with the device 1 in each base network.

Additionally, according to the above described embodiment, a reception port number for receiving a packet from the downstream side in the access GW apparatus 3 is assigned to each combination of a device 1 within each base network and a protocol type. The access GW apparatus 3 identifies a device 6 and a port number of a transfer destination on the basis of the reception port number with which the packet from the downstream side has been received, and further identifies a virtual IP address assigned to the device 1 that has transmitted the packet. Then, the access GW apparatus 3 transfers the packet to the identified device 6 by recognizing the identified virtual IP address as a transmission source IP address of the packet. Thus, the device 6 can transmit the packet to the virtual IP address.

Additionally, according to the above described embodiment, the access GW apparatus 3 identifies an M2M-GW apparatus 2 of a transfer destination upon receipt of a packet from the upstream side. When a tunnel connection with the identified M2M-GW apparatus 2 has not been established, the access GW apparatus 3 outputs, to the identified M2M-GW apparatus 2, a connection trigger for establishing a tunnel connection. This enables the tunnel connection with the M2M-GW apparatus 2 of the transfer destination to be automatically established.

Figure 21:
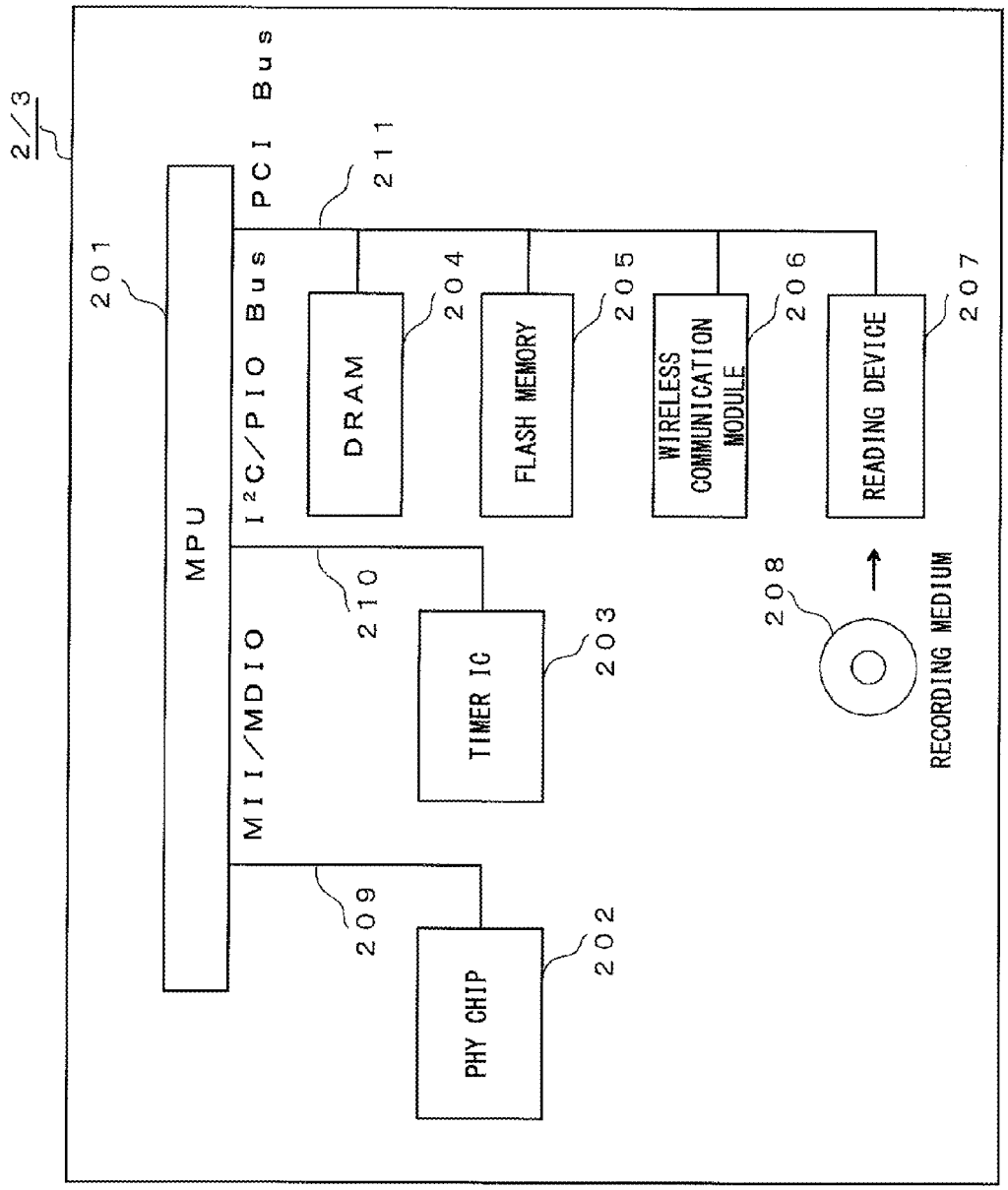
FIG. 21 illustrates an example of a hardware configuration of a relay apparatus according to the embodiment.

FIG. 21 illustrates an example of a hardware configuration of the relay apparatus (the M2M-GW apparatus 2 or the access GW apparatus 3) in this embodiment. The relay apparatus illustrated in FIG. 3 or 7 may be implemented with, for example, various types of hardware illustrated in FIG. 21. In the example illustrated in FIG. 21, the relay apparatus includes an MPU 201, a PHYsical layer (PHY) chip 202, and a timer IC (Integrated Circuit) 203. The relay apparatus also includes a Dynamic Random Access Memory (DRAM) 204, a flash memory 205, a wireless communication module 206 and a reading device 207.

A communication interface that connects between the MPU 201 and the PHY chip 202 is a Media Independent Interface or Management Data Input/Output (MII/MDIO) 209. Both the MII and the MDIO are an interface between a physical layer and a Media Access Control (MAC) sub-layer. Moreover, the MPU 201 and the timer IC 203 are connected via an Inter-Integrated Circuit or Parallel Input/Output ($I^2C$/PIO) bus 210. Additionally, the DRAM 204, the flash memory 205, the wireless communication module 206, and the reading device 207 are connected to the MPU 201 via a Peripheral Component Interconnect (PCI) bus 211.

The MPU 201 loads, into the DRAM 204, an operation program stored in the flash memory 205, which is one type of the nonvolatile storage devices, and executes various types of processes while using the DRAM 204 as a working memory. The MPU 201 can implement the function units of the control unit 23 or 33 illustrated in FIG. 3 or 7 by executing the operation program.

The above described processes may be executed in such a way that the operation program for performing the above described operations is stored on a computer-readable recording medium 208 such as a flexible disk, a Compact Disk-Read Only Memory (CD-ROM), a Digital Versatile Disk (DVD), a Magneto-Optical disk (MO), or the like, is distributed, and is installed on a computer after being made ready by the reading device 207 of the relay apparatus. Moreover, the operation program may be stored on a disk device or the like included in a server device on the Internet, and may be downloaded onto a computer of the relay apparatus via the PHY chip 202 or the wireless communication module 206.

Note that other types of storage devices besides the DRAM 204 and the flash memory 205 may be used in accordance with an embodiment. For example, the relay apparatus may include a Content Addressable Memory (CAM), a Static Random Access Memory (SRAM), a Synchronous Dynamic Random Access Memory (SDRAM), or the like.

The relay rule storage unit 221 or the conversion rule storage unit 321 illustrated in FIG. 3 or 7 is implemented with the DRAM 204, the flash memory 205, or other storage devices not illustrated.

The timer IC 203 is a circuit that performs a count-up operation until a set time period elapses, and outputs an interrupt signal after the set time period has elapsed.

The wireless communication module 206 is hardware that executes processes of a physical layer in a wireless connection. The wireless communication module 206 includes, for example, an antenna, an Analog-to-Digital Converter (ADC), a Digital-to-Analog Converter (DAC), a modulator, a demodulator, an encoder, a decoder and the like.

The hardware configuration of the relay apparatus may be different from that illustrated in FIG. 21 in accordance with an embodiment. Other hardware besides the types that are illustrated in FIG. 21 may be applicable to the relay apparatus.

The function units of the control unit 23 or 33 illustrated in FIG. 3 or 7 may be implemented with a hardware circuit. Specifically, the function units of the control unit 23 or 33 illustrated in FIG. 3 or 7 may be implemented with a reconfigurable circuit such as a Field Programmable Gate Array (FPGA) or the like or an Application Specific Integrated Circuit (ASIC) or the like as a replacement for the MPU 201. As a matter of course, these function units may be implemented with both the MPU 201 and the hardware circuit.

The embodiments have been described above. However, the embodiments are not limited to the above described ones. It is to be understood that various types of modifications and alterations of the above described embodiment be included. For example, it will be understood that various types of embodiments can be implemented by transforming the components within a scope that does not depart from the sprit and scope of the embodiments. Moreover, it will be understood that various embodiments can be implemented by suitably combining the plurality of components disclosed in the aforementioned embodiment. Additionally, a person having ordinary skill in the art will understand that various embodiments can be implemented by deleting or replacing some of the components disclosed in the embodiments, or by adding components to the components disclosed in the embodiments.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay apparatus communicatively connected, via a network, to a base relay apparatus arranged within a base network, the relay apparatus comprising:
   a communication interface configured to transmit and receive a packet; and
   a processor configured to relay the received packet in accordance with a specified rule, wherein
   upon receipt of the received packet addressed to a virtual IP (Internet Protocol) address assigned to each of the first devices having a communication function within the base network from a second device having a communication function outside of the base network,
   the processor identifies the base relay apparatus that accommodates the first device, to which the virtual IP address is assigned, on the basis of the virtual IP address and a protocol type of the received packet, and also identifies a reception port number of the identified base relay apparatus, which corresponds to a combination of the virtual IP address and the protocol type of the received packet, from among reception port numbers each assigned to a combination of the first device accommodated to identify a transfer destination, and a protocol type, and
   the processor relays the received packet from the second device by using the virtual IP address of the first device to determine reception port number of the identified base relay apparatus.

2. The relay apparatus according to claim 1, wherein
   a port number of a port that receives the packet relayed by the base relay apparatus is assigned to each combination of the first device of a transmission source, and a protocol type of the packet relayed by the base relay apparatus,
   upon receipt of the packet relayed by the base relay apparatus, the processor identifies the second device of the transfer destination of the packet on the basis of the port number by which the identified virtual IP address has been received, and also identifies a virtual IP address assigned to the first device of the transmission source of the received packet from among virtual IP addresses assigned to each of the first devices, and
   the processor relays the received packet to the identified second device by rewriting the IP address of the transmission source of the received packet with the identified virtual IP address.

3. The relay apparatus according to claim 1, further comprising
   the processor configured to output a trigger for establishing a tunnel connection with the identified base relay apparatus when the tunnel connection with the identified base relay apparatus has not been established, upon receipt of the packet addressed to the virtual IP address from the second device.

4. The relay apparatus according to claim 3, wherein
   the processor relays the received packet via a tunnel after the tunnel connection has been established.

5. The relay apparatus according to claim 3, wherein
   the tunnel connection is a VPN (Virtual Private Network) connection or a PPP (Point-to-Point Protocol) connection.

6. The relay apparatus according to claim 1, further comprising
   the processor configured to set a rule.

7. The relay apparatus according to claim 1, wherein
   the rule is a rule generated on the basis of content of a setting made by a user.

8. The relay apparatus according to claim 1, wherein
   the network is a wide area network.

9. A relay system including one or a plurality of base relay apparatuses each arranged within a base network, and a relay apparatus communicatively connected, via a network, to each of the base relay apparatuses, wherein:
   the relay apparatus comprises
      a first communication interface configured to transmit and receive a packet, and
      a first processor configured to relay the received packet in accordance with a specified first rule;
   upon receipt of the packet addressed to a virtual IP (Internet Protocol) address assigned to each of the first devices having a communication function within the base network from a second device having a communication function outside of the base network, the first processor identifies the base relay apparatus that accommodates the first device, to which the virtual IP address is assigned, on the basis of the virtual IP address and a protocol type of the received packet, and also identifies a reception port number of the identified base relay apparatus, which corresponds to a combination of the virtual IP address and the protocol type of the received packet, from among reception port numbers each assigned to a combination of the first device accommodated to identify a transfer destination, and a protocol type;

the first processor relays the received packet from the second device by using the virtual IP address of the first device to determine reception port number of the identified base relay apparatus;

each of the base relay apparatuses comprises
- a second communication interface configured to transmit and receive the packet, and
- a second processor configured to relay the received packet in accordance with a specified second rule;

the second processor identifies the first device of the transfer destination of the received packet on the basis of the reception port number by which the packet has been received, upon receipt of the packet relayed by the relay apparatus; and the second processor relays the received packet to the identified first device.

10. A relay method of a relay apparatus communicatively connected, via a network, to a base relay apparatus arranged within a base network, the method comprising:

upon receipt of a received packet addressed to a virtual IP (Internet Protocol) address assigned to each of the first devices having a communication function within the base network from a second device having a communication function outside of the base network, identifying the base relay apparatus that accommodates the first device, to which the virtual IP address is assigned, on the basis of the virtual IP address and a protocol type of the received packet, and also identifying a reception port number of the identified base relay apparatus, which corresponds to a combination of the virtual IP address and the protocol type of the received packet, from among reception port numbers each assigned to a combination of the first device accommodated to identify a transfer destination, and a protocol type;

relaying the received packet from the second device by using the virtual IP address of the first device to determine reception port number of the identified base relay apparatus.

11. A non-transitory computer-readable recording medium having stored therein a program for causing a computer of a relay apparatus, which is communicatively connected, via a network, to a base relay apparatus arranged within a base network, to execute a process comprising:

upon receipt of a received packet addressed to a virtual IP (Internet Protocol) address assigned to each of the first devices having a communication function within the base network from a second device having a communication function outside of the base network, identifying the base relay apparatus that accommodates the first device, to which the virtual IP address is assigned, on the basis of the virtual IP address and a protocol type of the received packet, and also identifying a reception port number of the identified base relay apparatus, which corresponds to a combination of the virtual IP address and the protocol type of the received packet, from among reception port numbers each assigned to a combination of the first device accommodated to identify a transfer destination, and a protocol type; and relaying the received packet from the second device by using the virtual IP address of the first device to determine reception port number of the identified base relay apparatus.

* * * * *